(12) United States Patent
Labrou et al.

(10) Patent No.: US 7,877,605 B2
(45) Date of Patent: Jan. 25, 2011

(54) OPINION REGISTERING APPLICATION FOR A UNIVERSAL PERVASIVE TRANSACTION FRAMEWORK

(75) Inventors: Yannis Labrou, Baltimore, MD (US); Lusheng Ji, Randolph, NJ (US); Jonathan Russell Agre, Brinklow, MD (US); Jesus Molina Terriza, Washington, DC (US)

(73) Assignee: Fujitsu Limited, Kawasaki (JP)

( * ) Notice: Subject to any disclaimer, the term of this patent is extended or adjusted under 35 U.S.C. 154(b) by 801 days.

(21) Appl. No.: 11/041,223

(22) Filed: Jan. 25, 2005

(65) Prior Publication Data

US 2005/0203966 A1    Sep. 15, 2005

Related U.S. Application Data

(60) Provisional application No. 60/541,903, filed on Feb. 6, 2004.

(51) Int. Cl.
H04L 29/06 (2006.01)
(52) U.S. Cl. .......................... 713/168; 713/155; 726/3; 380/255
(58) Field of Classification Search ......... 713/150–153, 713/155, 160–161, 168–171; 726/2–3, 16–18, 726/21; 380/255, 259, 270, 273, 277–278, 380/44–47; 705/50, 57–58, 64, 72, 74–75; 709/227–229
See application file for complete search history.

(56) References Cited

U.S. PATENT DOCUMENTS

| | | | |
|---|---|---|---|
| 4,182,261 A | 1/1980 | Smith, III et al. | |
| 4,253,086 A | 2/1981 | Szwarcbier | |
| 4,458,109 A | * | 7/1984 | Mueller-Schloer ........... 380/30 |
| 4,582,985 A | 4/1986 | Lofberg | |
| 4,636,622 A | 1/1987 | Clark | |

(Continued)

FOREIGN PATENT DOCUMENTS

CA    2291430 A1    7/2000

(Continued)

OTHER PUBLICATIONS

Herschberg, Mark A. "Secure Electronic Voting Over the World Wide Web," Massachusetts Institute of Technology, May 27, 1997.*

(Continued)

*Primary Examiner*—Kimyen Vu
*Assistant Examiner*—Darren Schwartz
(74) *Attorney, Agent, or Firm*—Staas & Halsey LLP

(57) ABSTRACT

A computer-based system securely transmitting and authenticating a transaction input by a user while retaining the anonymity of the user with respect to content of the transaction, including a device encoding the content of the transaction input by the user with a key known only to another device, encoding other portions of the transaction with another key known only to a secure transaction server, and sending the encoded content of the transaction and the encoded other portions of the transaction to the secure transaction server to authenticate an identity of the user of the device, wherein the secure transaction server decodes the other portions of the transaction and sends the encoded content of the transaction to the another device to be finally decoded.

25 Claims, 8 Drawing Sheets

U.S. PATENT DOCUMENTS

| | | | |
|---|---|---|---|
| 4,882,195 A | 11/1989 | Butland | |
| 5,095,194 A | 3/1992 | Barbanell | |
| 5,194,289 A | 3/1993 | Butland | |
| 5,239,166 A | 8/1993 | Graves | |
| 5,256,863 A | 10/1993 | Ferguson et al. | |
| 5,363,453 A | 11/1994 | Gagne et al. | |
| 5,465,328 A | 11/1995 | Dievendorff et al. | |
| 5,485,312 A | 1/1996 | Horner et al. | |
| 5,521,980 A * | 5/1996 | Brands | 380/30 |
| 5,598,474 A | 1/1997 | Johnson | |
| 5,631,961 A | 5/1997 | Mills et al. | |
| 5,644,118 A | 7/1997 | Hayashida | |
| 5,666,420 A | 9/1997 | Micali | |
| 5,732,148 A | 3/1998 | Keagy et al. | |
| 5,790,677 A | 8/1998 | Fox et al. | |
| 5,794,207 A | 8/1998 | Walker et al. | |
| 5,869,822 A | 2/1999 | Meadows, II et al. | |
| 5,913,203 A | 6/1999 | Wong et al. | |
| 5,917,168 A | 6/1999 | Nakamura et al. | |
| 5,949,043 A | 9/1999 | Hayashida | |
| 5,956,404 A | 9/1999 | Schneier et al. | |
| 6,003,762 A | 12/1999 | Hayashida | |
| 6,003,767 A | 12/1999 | Hayashida | |
| 6,006,328 A | 12/1999 | Drake | |
| 6,010,068 A | 1/2000 | Bozzo | |
| 6,032,258 A * | 2/2000 | Godoroja et al. | 726/3 |
| 6,044,388 A | 3/2000 | DeBellis et al. | |
| 6,067,621 A | 5/2000 | Yu et al. | |
| 6,069,969 A | 5/2000 | Keagy et al. | |
| 6,081,793 A * | 6/2000 | Challener et al. | 705/50 |
| 6,098,053 A | 8/2000 | Slater | |
| 6,115,601 A | 9/2000 | Ferreira | |
| 6,137,884 A | 10/2000 | Micali | |
| 6,163,771 A | 12/2000 | Walker et al. | |
| 6,175,922 B1 | 1/2001 | Wang | |
| 6,175,923 B1 | 1/2001 | Bailey | |
| 6,182,892 B1 | 2/2001 | Angelo et al. | |
| 6,199,099 B1 | 3/2001 | Gershman et al. | |
| 6,212,290 B1 | 4/2001 | Gagne et al. | |
| 6,226,752 B1 | 5/2001 | Gupta et al. | |
| 6,257,487 B1 | 7/2001 | Hayashida | |
| 6,263,436 B1 | 7/2001 | Franklin et al. | |
| 6,270,011 B1 | 8/2001 | Gottfried | |
| 6,334,575 B1 | 1/2002 | Su-Hui | |
| 6,356,752 B1 | 3/2002 | Griffith | |
| 6,366,893 B2 | 4/2002 | Hannula et al. | |
| 6,367,010 B1 * | 4/2002 | Venkatram et al. | 713/171 |
| 6,377,692 B1 | 4/2002 | Takahashi et al. | |
| 6,378,073 B1 | 4/2002 | Davis | |
| 6,378,775 B2 | 4/2002 | Hayashida | |
| 6,405,314 B1 | 6/2002 | Bailey | |
| 6,435,406 B1 | 8/2002 | Pentel | |
| 6,470,448 B1 * | 10/2002 | Kuroda et al. | 713/176 |
| 6,512,919 B2 | 1/2003 | Ogasawara | |
| 6,529,885 B1 | 3/2003 | Johnson | |
| 6,587,684 B1 | 7/2003 | Hsu et al. | |
| 6,640,303 B1 * | 10/2003 | Vu | 713/171 |
| 6,687,375 B1 | 2/2004 | Matyas et al. | |
| 6,715,679 B1 | 4/2004 | Infosino | |
| 6,766,453 B1 | 7/2004 | Nessett et al. | |
| 6,775,777 B2 | 8/2004 | Bailey | |
| 6,817,521 B1 | 11/2004 | Matada | |
| 6,874,029 B2 | 3/2005 | Hutcheson et al. | |
| 6,915,951 B2 | 7/2005 | Hayashida | |
| 6,926,200 B1 | 8/2005 | Hayashida | |
| 6,931,431 B2 | 8/2005 | Cachin et al. | |
| 6,957,334 B1 | 10/2005 | Goldstein et al. | |
| 6,985,583 B1 * | 1/2006 | Brainard et al. | 380/44 |
| 7,003,499 B2 | 2/2006 | Arditti et al. | |
| 7,025,256 B1 | 4/2006 | Drummond et al. | |
| 7,089,208 B1 | 8/2006 | Levchin et al. | |
| 7,099,471 B2 * | 8/2006 | Neff | 380/30 |
| 7,167,844 B1 | 1/2007 | Leong et al. | |
| 7,200,749 B2 | 4/2007 | Wheeler et al. | |
| 7,239,346 B1 | 7/2007 | Priddy | |
| 7,379,916 B1 | 5/2008 | Mizrah | |
| 7,427,033 B1 | 9/2008 | Roskind | |
| 7,578,436 B1 | 8/2009 | Kiliccote | |
| 2001/0004231 A1 | 6/2001 | Bailey | |
| 2001/0005840 A1 | 6/2001 | Verkama | |
| 2001/0010723 A1 | 8/2001 | Pinkas | |
| 2001/0034670 A1 | 10/2001 | Blair | |
| 2001/0037254 A1 | 11/2001 | Glikman | |
| 2001/0037264 A1 | 11/2001 | Husemann et al. | |
| 2001/0045458 A1 | 11/2001 | Polansky | |
| 2001/0053239 A1 | 12/2001 | Takhar | |
| 2001/0056409 A1 * | 12/2001 | Bellovin et al. | 705/64 |
| 2002/0017561 A1 | 2/2002 | Tomoike | |
| 2002/0018585 A1 | 2/2002 | Kim | |
| 2002/0052841 A1 | 5/2002 | Guthrie et al. | |
| 2002/0056040 A1 * | 5/2002 | Simms | 713/171 |
| 2002/0057803 A1 | 5/2002 | Loos et al. | |
| 2002/0073024 A1 | 6/2002 | Gilchrist | |
| 2002/0077885 A1 * | 6/2002 | Karro et al. | 705/12 |
| 2002/0077974 A1 | 6/2002 | Ortiz | |
| 2002/0077993 A1 | 6/2002 | Immonen et al. | |
| 2002/0082925 A1 | 6/2002 | Herwig | |
| 2002/0087534 A1 | 7/2002 | Blackman et al. | |
| 2002/0087869 A1 | 7/2002 | Kim | |
| 2002/0095296 A1 | 7/2002 | Hind et al. | |
| 2002/0095570 A1 | 7/2002 | Eldridge et al. | |
| 2002/0097867 A1 | 7/2002 | Bartram | |
| 2002/0107007 A1 | 8/2002 | Gerson | |
| 2002/0107791 A1 | 8/2002 | Nobrega | |
| 2002/0141575 A1 | 10/2002 | Hird | |
| 2002/0163421 A1 | 11/2002 | Wang et al. | |
| 2002/0174336 A1 | 11/2002 | Sakakibara et al. | |
| 2002/0176579 A1 | 11/2002 | Deshpande et al. | |
| 2002/0196944 A1 | 12/2002 | Davis et al. | |
| 2003/0046541 A1 | 3/2003 | Gerdes et al. | |
| 2003/0061486 A1 | 3/2003 | Shibuya et al. | |
| 2003/0123667 A1 | 7/2003 | Weber et al. | |
| 2003/0174049 A1 | 9/2003 | Beigel et al. | |
| 2003/0190046 A1 * | 10/2003 | Kamerman et al. | 380/286 |
| 2003/0204726 A1 | 10/2003 | Kefford et al. | |
| 2003/0226030 A1 | 12/2003 | Hurst et al. | |
| 2004/0030894 A1 * | 2/2004 | Labrou et al. | 713/168 |
| 2004/0104268 A1 | 6/2004 | Bailey | |
| 2004/0123098 A1 * | 6/2004 | Chen et al. | 713/155 |
| 2004/0123159 A1 | 6/2004 | Kerstens et al. | |
| 2004/0151323 A1 * | 8/2004 | Olkin et al. | 380/280 |
| 2004/0153649 A1 | 8/2004 | Rhoads et al. | |
| 2004/0158492 A1 | 8/2004 | Lopez et al. | |
| 2004/0234117 A1 | 11/2004 | Tibor | |
| 2005/0067485 A1 | 3/2005 | Caron | |
| 2005/0122209 A1 | 6/2005 | Black | |
| 2005/0194452 A1 | 9/2005 | Nordentoft et al. | |
| 2006/0004862 A1 | 1/2006 | Fisher et al. | |
| 2006/0229988 A1 | 10/2006 | Oshima et al. | |
| 2006/0266823 A1 | 11/2006 | Passen et al. | |

FOREIGN PATENT DOCUMENTS

| | | |
|---|---|---|
| DE | 103 10 527 | 9/2004 |
| DE | 103 10 527 A1 | 9/2004 |
| EP | 0950968 | 2/1999 |
| EP | 0 982 674 A2 | 3/2000 |
| EP | 1 120 761 A2 | 8/2001 |
| EP | 1 178 444 A1 | 2/2002 |
| EP | 1 231 578 | 8/2002 |
| EP | 1 231 578 A2 | 8/2002 |
| EP | 1 237 132 A2 | 9/2002 |
| EP | 1 237 133 A2 | 9/2002 |
| EP | 1 237 134 A2 | 9/2002 |

| | | |
|---|---|---|
| EP | 1 388 797 A2 | 2/2004 |
| GB | 2 386 236 | 9/2003 |
| JP | 2000-36000 | 2/2000 |
| JP | 2000-207483 | 7/2000 |
| JP | 2000-269957 | 9/2000 |
| JP | 2001-147984 | 5/2001 |
| JP | 2001-331755 | 11/2001 |
| JP | 2002-215027 | 7/2002 |
| JP | 2002-259621 | 9/2002 |
| KR | 2000-0068758 | 11/2000 |
| WO | WO 97-41932 | 11/1997 |
| WO | WO 97/45814 | 12/1997 |
| WO | WO 97-45814 | 12/1997 |
| WO | WO 98/25371 | 6/1998 |
| WO | WO 98/37524 | 8/1998 |
| WO | WO 00/46959 | 8/2000 |
| WO | WO 01/01361 | 1/2001 |
| WO | WO 01-35570 | 5/2001 |
| WO | WO 01/80133 | 10/2001 |
| WO | WO 01/98854 | 12/2001 |
| WO | WO 02/07117 | 1/2002 |
| WO | WO 02/11082 | 2/2002 |
| WO | WO 02/13151 | 2/2002 |
| WO | WO 02/27421 | 4/2002 |
| WO | WO 02/27439 | 4/2002 |
| WO | WO 02/29708 | 4/2002 |
| WO | WO 02/29739 | 4/2002 |
| WO | WO02/41271 | 5/2002 |
| WO | WO 02/43020 | 5/2002 |
| WO | WO 02/054655 | 7/2002 |
| WO | WO 02-59849 | 8/2002 |
| WO | WO 02/067534 | 8/2002 |

OTHER PUBLICATIONS

Wen-Sheng et al. "A verifiable multi-authorities secret elections allowing abstaining from voting." International Computer Symposium, Tainan, Taiwan, 1998.*

Jan et al. "The Design of Protocol for e-Voting on the Internet." IEEE, Oct. 2001.*

Jinn-ke Jan et al. "A secure anonymous voting protocol with a complete supervision." Comput. Syst. Sci. Eng. 17(4/5): 213-221 (2002).*

Jan, Jinn-ke et al. "A Secure Anonymous Voting Protocol with a Complete Supervision," 2002, Journal of computer Sciences and Engineering, vol. 17, pp. 213-221.*

Deborah Bach, "CIBC Makes Long-Term Case for Wireless" [online], American Banker, vol. 167, No. 65, Apr. 5, 2002 (2 pages) [retrieved on Aug. 2, 2002]. Retrieved from the Internet: <URL: http://www.nerac.com>.

"Wawa Installs Wireless Card Processing" [online], CardLine, 2001 (1 page) [retrieved on Aug. 2, 2002]. Retrieved from the Internet: <URL: http://www.nerac.com>.

Jennifer A. Kingson, "First Data Sets Strategy for Wireless" [online], American Banker, vol. 167, No. 17, Jan. 25, 2002 (3 pages) [retrieved on Aug. 2, 2002]. Retrieved from the Internet: <URL: http://www.nerac.com>.

"Thirsty? Soon you may be able to charge and chug" [online], USA Today, Dec. 21, 2001, p. 7B (1 page) [retrieved on Aug. 2, 2002]. Retrieved from the Internet: <URL: http://www.nerac.com>.

M. Giometti, et al., "Creating Winning M-Commerce Models in the Financial Services" [online], FutureBanker, vol. 5, No. 10, Dec. 2001, p. 37 (2 pages) [retrieved on Aug. 2, 2002]. Retrieved from the Internet: <URL: http://www.nerac.com>.

"Hongkong Post Launches Mobile e-Certs" [online], Online Reporter, Oct. 22, 2001 (2 page) [retrieved on Aug. 2, 2002]. Retrieved from the Internet: <URL: http://www.nerac.com>.

"Wallet and WIM pilot" [online], Mobile Europe, Oct. 2001, p. 16 (1 page) [retrieved on Aug. 2, 2002]. Retrieved from the Internet: <URL: http://www.nerac.com>.

"Regional News: Asia/Pacific: DoCoMo, Sony Use E-Purse, PDAs In Mobile Commerce Trial" [online]. Card Technology, vol. 2, No. 10, Oct. 2001 (1 page) [retrieved on Aug. 2, 2002]. Retrieved from the Internet: <URL: http://www.nerac.com>.

"Wildcard Sure Mobile Pizza Pilot Will Deliver" [online]. CardLine, Oct. 2001 (1 page) [retrieved on Aug. 2, 2002]. Retrieved from the Internet: <URL: http://www.nerac.com>.

Varshney, Upkar, et al., "Mobile commerce: Framework, applications and networking support" [online]. Mobile Networks Appl., vol. 7, No. 3, Jun. 2002, pp. 185-198 (1 page) [retrieved on Aug. 2, 2002]. Retrieved from the Internet: <URL: http://www.nerac.com>.

Friis-Hansen, et al., "Secure electronic transactions—The mobile phone evolution continues" [online]. Ericsson Rev. (Engl. Ed); vol. 78, No. 4, 2001, pp. 162-167 (1 page) [retrieved on Aug. 2, 2002]. Retrieved from the Internet: <URL: http://www.nerac.com>.

Bettstetter, Christian, et al., "(Auto) mobile communication in a heterogeneous and converged world" [online]. IEEE Pers Commun., vol. 8, No. 6, Dec. 2001, pp. 41-47 (1 page) [retrieved on Aug. 2, 2002]. Retrieved from the Internet: <URL: http://www.nerac.com>.

Gupta, S., "Securing the wireless internet" [online]. IEEE Commun. Mag., vol. 39, No. 12, Dec. 2001, pp. 68-75 (1 page) [retrieved on Aug. 2, 2002]. Retrieved from the Internet: <URL: http://www.nerac.com>.

Aalders, K., "Travel card: Airport self-check in using a wireless PDA" [online]. IEEE Conf. Intell Transport Syst Proc ITSC, 2001, pp. 1224-1228 (1 page) [retrieved on Aug. 2, 2002]. Retrieved from the Internet: <URL: http://www.nerac.com>.

Brananaghan, R.J., "Human factors issues in the design of handheld wireless devices" [online]. Proc SPIE Int Soc Opt Eng, vol. 4428, 2001, pp. 37-41 (1 page) [retrieved on Aug. 2, 2002]. Retrieved from the Internet: <URL: http://www.nerac.com>.

Cohn, Michael, Like money in your hand: Wireless technology lets financial firms quickly deliver transactions and trades. (Financial Services) [online]. Internet World, vol. 8, No. 5, May 1, 2002, pp. 54(3) (4 pages). [retrieved on Aug. 2, 2002]. Retrieved from the Internet: <URL: http://www.nerac.com>.

Ray Cammack Shows. (M&S News). (to use wireless credit card terminals) (Brief Article) [online]. Amusement Business, vol. 114, No. 17, Apr. 29, 2002, pp. 4(1) (1 page) [retrieved on Aug. 2, 2002]. Retrieved from the Internet: <URL: http://www.nerac.com>.

Kabaher, April, MasterCard snags citi exec for new wireless role. (Brief Article) [online]. Financial Net News, vol. 7, No. 14, Apr. 8, 2002, pp. 1(2) (1 page) [retrieved on Aug. 2, 2002]. Retrieved from the Internet: <URL: http://www.nerac.com>.

"Pepsi North America tests wireless vending in Memphis" [online]. Automatic Merchandiser, vol. 44, No. 2, Feb. 1, 2002, pp. 9(1) (1 page) [retrieved on Aug. 2, 2002]. Retrieved from the Internet: <URL: http://www.nerac.com>.

Radding, Alan, "Crossing the Wireless Security Gap." [online]. Computerworld, Jan. 1, 2001 (3 pages) [retrieved on Aug. 2, 2002]. Retrieved from the Internet: <URL: http://www.nerac.com>.

Commercianti inks wireless deal. (EDS will provide transaction processing services for Commercianti's wireless terminals) (Brief Article) [online]. Houston Business Journal, vol. 32, No. 23, Oct. 19, 2001 (1 page) [retrieved on Aug. 2, 2002]. Retrieved from the Internet: <URL: http://www.nerac.com>.

"Wireless in Boston (Fleet HomeLink offers services through personal digital assistants) (Brief Article)" [online]. Bank Marketing, vol. 33, No. 7, Sep. 1, 2001 (1 page) [retrieved on Aug. 2, 2002]. Retrieved from the Internet: <URL: http://www.nerac.com>.

Murphy, Patricia A., Wireless payment technology spreads from gas pump to store. (VeriFone system) [online]. Stores, vol. 83, No. 5, May 1, 2001, pp. 74(2) (1 page) [retrieved on Aug. 2, 2002]. Retrieved from the Internet: <URL: http://www.nerac.com>.

Hoffman, Karen Epper, New Options in Wireless Payments. (Company Business and Marketing) [online]. Internet World, vol. 7, No. 7, Apr. 1, 2001, pp. 37 (4 pages) [retrieved on Aug. 2, 2002]. Retrieved from the Internet: <URL: http://www.nerac.com>.

Khachtchanski, V.I., et al., "Universal SIM toolkit-based client for mobile authorization system" [online]. Third International Conference on Information Integration and Web-based Applications and Services, 2001, pp. 337-344 (1 page) [retrieved on Aug. 2, 2002]. Retrieved from the Internet: <URL: http://www.nerac.com>.

"CIBC kicks off wireless banking service" [online]. Bank Systems + Technology, vol. 39, No. 5, May 2002, p. 12 (1 page) [retrieved on Aug. 2, 2002]. Retrieved from the Internet: <URL: http://www.nerac.com>.

Asthana, Abhaya, et al., An Indoor Wireless System for Personalized Shopping Assistance (1994) [online]. IEEE Workshop on Mobile Computing Systems and Applications (1 page) [retrieved on Aug. 2, 2002]. Retrieved from the Internet: <URL: http://www.nerac.com>.

Electronic payment systems, involving mobile phones (list of e-products, 15 listings), [online] Electronic Payment System Observatory (the ePSO website aims to monitor the progress of retail payment innovation throughout Europe, ePSO inventory of E-Payment services—List of e-products) (26 pages). European Central Bank, Frankfurt, Germany, 2002 [retrieved Sep. 11, 2002]. Retrieved from the Internet: <http://epso.intrasoft.lu>.

Yannis Labrou, et al., "Wireless Wallet", Proceedings of the First Annual International Conference on Mobile and Ubiquitous Systems: Networking and Services (MobiQuitous '04); ISBN: 0-7695-2208-4, IEEE, Aug. 22, 2004.

Mobile, Academic Press Dictionary of Science and Technology, xreferplus (1992); http://xreferplus.com/entry.jsp?xrefid=3130947&secid=.&hh=1.

Purchase, 1996, Merriam-Webster's Dictionary of Law, http://dictionary.reference.com/browse/purchase, p. 4.

U.S. Appl. No. 60/401,807, filed Aug. 8, 2002, Yannis Labrou, et al., Fujitsu Limited Kawasaki, Japan.

U.S. Appl. No. 10/458,205, filed Jun. 11, 2003, Yannis Labrou, et al., Fujitsu Limited Kawasaki, Japan.

U.S. Appl. No. 10/628,584, filed Jul. 29, 2003, Yannis Labrou, et al., Fujitsu Limited Kawasaki, Japan.

U.S. Appl. No. 10/628,569, filed Jul. 29, 2003, Yannis Labrou, et al., Fujitsu Limited Kawasaki, Japan.

U.S. Appl. No. 10/628,583, filed Jul. 29, 2003, Yannis Labrou, et al., Fujitsu Limited Kawasaki, Japan.

U.S. Appl. No. 60/554,300, filed Feb. 17, 2004, Yannis Labrou, et al., Fujitsu Limited Kawasaki, Japan.

U.S. Appl. No. 60/669,375, filed Apr. 8, 2005, Yannis Labrou, et al., Fujitsu Limited Kawasaki, Japan.

U.S. Appl. No. 11/045,484, filed Jan. 31, 2005, Yannis Labrou, et al., Fujitsu Limited Kawasaki, Japan.

U.S. Appl. No. 60/703,862, filed Aug. 1, 2005, Yannis Labrou, et al., Fujitsu Limited Kawasaki, Japan.

U.S. Appl. No. 11/388,202, filed Mar. 24, 2006, Yannis Labrou, et al., Fujitsu Limited Kawasaki, Japan.

U.S. Appl. No. 11/488,178, filed Jul. 18, 2006, Yannis Labrou, et al., Fujitsu Limited Kawasaki, Japan.

U.S. Appl. No. 60/541,903, filed Feb. 6, 2004, Yannis Labrou, et al., Fujitsu Limited Kawasaki, Japan.

U.S. Appl. No. 60/549,148, filed Mar. 3, 2004, Yannis Labrou, et al., Fujitsu Limited Kawasaki, Japan.

U.S. Appl. No. 60/575,835, filed Jun. 2, 2004, Yannis Labrou, et al., Fujitsu Limited Kawasaki, Japan.

PCT International Search Report dated Oct. 4, 2005 for International Application No. PCT/US05/04049 related to the above-identified present pending US patent application (2 pages).

Form PCT/ISA/237—Written Opinion of the International Searching Authority dated Oct. 4, 2005 in International Application No. PCT/US05/04049 related to the above-identified present pending US patent application (3 pages).

International Preliminary Report on Patentability (Chapter I of the Patent Cooperation Treaty) dated Aug. 22, 2006 in International Application No. PCT/US05/04049 related to the above-identified present pending US patent application (5 pages).

European Communication Pursuant to Article 96(2) EPC dated Jul. 26, 2005 in European Application No. 03 254 927.1-1238, related to the above-identified present pending US patent application (6 pages).

European Search Report Communication issued by the European Patent Office on Aug. 30, 2004 in European Application No. 03254927.1-1238 related to the above-identified present pending US patent application (3 pages).

European Search Report Communication issued by the European Patent Office on Jan. 8, 2007 in Application No. 06253923.4-1238 related to the above-identified present pending US patent application (13 pages).

Nerac (Patents, Intellectual Property, Research), [online]. Nerac, Inc. Tolland CT, USA, 4 pages [retrieved Dec. 18, 2006]. Retrieved from the Internet: <URL: http://www.nerac.com>.

MeT Mobile electronic Transactions (MeT limited is a company founded to establish a framework for secure mobile transactions) [online]. Mobile electronic Transactions Limited, 2003, 3 pages [retrieved Jan. 5, 2005]. Retrieved from the Internet: <URL: http://www.mobiletransaction.org>.

Two-Factor Token Matrix [online]. Diversinet Corp., 2 pages [retrieved on Mar. 24, 2006]. Retrieved from the Internet: <URL: http://www.diversinet.com/>.

Diversinet Delivers Consumer-Ready Soft Token Strong Authentication Solution [online]. Diversinet Corp., Feb. 7, 2006, 2 pages [retrieved on Dec. 27, 2006]. Retrieved from the Internet: <URL: http://www.diversinet.com/html/press/2006/consumer.html>.

Labrou, Yannis, Re: Mobile payments with a downloadable application from PayWi (referencing "PayWi Powers Personal Payments in Your Palm," PRNewswire, Portland Oregon, Feb. 6, 2006) [online]. Feb. 21, 2006 (4 pages) [retrieved Mar. 24, 2006]. Retrieved from the Internet: <URL: http://uptf.blogspot.com/2006/02/mobile-payments-with-downloadable.html>.

Labrou, Yannis. UPTF blog (a blog for Wireless Wallet) [online] 22 pages [retrieved Dec. 27, 2006] Retrieved from the Internet: <URL: http://uptf.blogspot.com>.

Electronic Payment System Observatory (the ePSO website aims to monitor the progress of retail payment innovation throughout Europe, ePSO inventory of E-Payment services—List of e-products) [online]. European Central Bank, Frankfurt, Germany (3 pages) [retrieved Dec. 18, 2006]. Retrieved from the Internet: <URL: http://epso.intrasoft.lu>.

"Via Licensing Begins Process to Form Wireless Networking Patent Licensing Pool" [online]. Via Licensing Corporation, Oct. 23, 2003, 3 pages [retrieved Nov. 17, 2003]. Retrieved from the Internet: <URL: http://www.vialicensing.com/news/details.cfm?VIANEWS_ID=308>.

Labrou, Yannis, 'Re: Motorola's M-Wallet: Mobile payments with a J2ME application' (referencing "Motorola M-Wallet Solution" brochure Motorola, Inc. 2006) In UPTF blog for Wireless Wallet [online], Feb. 21, 2006, 5 pages [retrieved Mar. 24, 2006]. Retrieved from the Internet: <URL: http://uptf.blogspot.com/2006/02/mobile-payment-with-downloadable.html>.

IEEE Standards Association (IEEE Std 802.11 and amendments) (802.11 patent information) [online]. IEEE-SA, 19 pages [retrieved Dec. 27, 2006]. Retrieved from the Internet: <URL: http://standards.ieee.org/db/patents/pat802_11.html>.

European Search Report Communication issued by the European Patent Office on Apr. 23, 2007 in Application No. 06251957.4-1244 related to the above-identified present pending US patent application (9 pages).

Asthana, Abhaya, et al., An Indoor Wireless System for Personalized Shopping Assistance (1994) [online]. IEEE Workshop on Mobile Computing Systems and Applications (1 page Abstract) [retrieved on Aug. 2, 2002]. Retrieved from the Internet: <URL: http://www.nerac.com>.

Alfred J. Menezes, et al., "Handbook of Applied Cryptography", 1997 CRC Press LLC, Section 1.5 Symmetric-key encryption, (9 pages).

Summons to Attend Oral Proceedings; Annex to the Summons Preliminary Opinion of the Examining Division issued on Mar. 12, 2008 by the European Patent Office in the related European Patent Application No. 03254927.1-1238 (10 pages).

Menezes, Paul et al. "Handbook of Applied Cryptography" 5th Edition (Aug. 2001), Copyright 1996 CRC Press, Chapter 9.78 (pp. 321-383).

U.S. Office Action mailed Jan. 9, 2008 in co-pending related U.S. Appl. No. 10/628,584 (12 pages).

U.S. Office Action mailed Feb. 12, 2008 in co-pending related U.S. Appl. No. 10/628,584 (7 pages).

U.S. Office Action mailed Sep. 27, 2006 in co-pending related U.S. Appl. No. 10/628,584 (17 pages).
U.S. Office Action mailed Apr. 19, 2007 in co-pending related U.S. Appl. No. 10/628,584 (41 pages).
U.S. Office Action (Notice of Allowance) mailed Oct. 1, 2007 in co-pending related U.S. Appl. No. 10/628,584 (14 pages).
U.S. Office Action mailed May 3, 2007 in co-pending related U.S. Appl. 10/628,569 (10 pages).
U.S. Office Action mailed Oct. 14, 2008 in co-pending related U.S. Appl. No. 10/628,569 (2 pages).
U.S. Office Action mailed Oct. 19, 2007 in co-pending related U.S. Appl. No. 10/628,569 (12 pages).
U.S. Office Action mailed Jun. 26, 2008 in co-pending related U.S. Appl. No. 10/628,569 (19 pages).
U.S. Office Action mailed Apr. 2, 2009 in co-pending related U.S. Appl. No. 10/628,569 (18 pages).
U.S. Office Action mailed Aug. 31, 2009 in co-pending related U.S. Appl. No. 10/628,583 (16 pages).
U.S. Office Action mailed Jun. 26, 2008 in co-pending related U.S. Appl. No. 10/628,569 (19 pages).
U.S. Office Action mailed Nov. 24, 2009 in co-pending related U.S. Appl. No. 10/628,569 (26 pages).
U.S. Office Action (Advisory Action) mailed Feb. 28, 2008 in co-pending related U.S. Appl. No. 10/628,569 (2pages).
U.S. Office Action mailed May 22, 2007 in co-pending related U.S. Appl. No. 10/458,205 (31 pages).
U.S. Office Action mailed Jan. 5, 2007 in co-pending related U.S. Appl. No. 10/458,205 (13 pages).
U.S. Office Action mailed Oct. 29, 2007 in co-pending related U.S. Appl. No. 10/458,205 (9 pages).
U.S. Office Action mailed Mar. 16, 2009 in co-pending related U.S. Appl. No. 10/628,583 (8 pages).
U.S. Office Action mailed Jul. 2, 2008 in co-pending related U.S. Appl. No. 10/628,583 (22 pages).
U.S. Office Action mailed Dec. 27, 2007 in co-pending related U.S. Appl. No. 10/628,583 (49 pages).
U.S. Office Action mailed Mar. 8, 2007 in co-pending related U.S. Appl. No. 10/628,583 (29 pages).
U.S. Office Action mailed Apr. 17, 2008 in co-pending related U.S. Appl. No. 10/628,583 (8 pages).
U.S. Office Action mailed Jul. 2, 2008 in co-pending related U.S. Appl. No. 10/628,583 (17 pages).
U.S. Office Action mailed Jun. 25, 2008 in co-pending related U.S. Appl. No. 11/045,484 (21 pages).
U.S. Office Action mailed Nov. 21, 2008 in co-pending related U.S. Appl. No. 11/045,484 (24 pages).
U.S. Office Action mailed Apr. 13, 2009 in co-pending related U.S. Appl. No. 11/045,484 (28 pages).
U.S. Office Action mailed Nov. 24, 2009 in co-pending related U.S. Appl. No. 11/045,484 (51 pages).
U.S. Office Action mailed Oct. 1, 2008 in co-pending related U.S. Appl. No. 11/388,202 (25 pages).
U.S. Office Action (Supplemental Action Notice of Allowability) mailed Jun. 18, 2009 in co-pending related U.S. Appl. No. 11/388,202 (3pages).
U.S. Office Action (Notice of Allowance) mailed Jun. 1, 2009 in co-pending related U.S. Appl. No. 11/388,202 (32 pages).
U.S. Office Action (Supplemental Action Notice of Allowability) mailed Sep. 18, 2009 in co-pending related U.S. Appl. No. 11/388,202 (15 pages).
U.S. Office Action mailed Jul. 16, 2008 in co-pending related U.S. Appl. No. 11/388,202 (6 pages).
First Notification of Office action issued by the State Intellectual Property Office of China on Nov. 13, 2009 in related Chinese Patent Application No, 200610109167.7(5 pages) English Translation (7 pages).
U.S. Office Action mailed Oct. 21, 2009 in co-pending related U.S. Appl. No. 11/488,178 (48 pages).
European Communication Pursuant to Article 94(3) EPC dated May 19, 2009 in European Application No. 03 254 926.3-2413, related to the above-identified present pending US patent application (7 pages).
Japanese Office Action mailed on Oct. 20, 2009 in related Japanese Patent Application No. 2006-554126 (4 pages); English Translation (8 pages).
European Office Action mailed on Nov. 19, 2009 in related European Patent Application No. 06251957.4-1244.
Japanese Office Action Mailed Jul. 14, 2009 issued in related Japanese Application No. 2006-554126 (6 pages) (translation 5 pages).
Japanese Office Action Mailed Jan. 19, 2010 in related Japanese Application No. 2003-289408 (4 pages).
Iyer, Sundar, *UNIX and Internet Security*, Department of Computer Science and Engineering, Indian Institute of Technology, Bombay, Mar. 1997 (38 pages).
U.S. Office Action mailed Jun. 23, 2010 in related co-pending U.S. Appl. No. 10/628,569, (In English).
Second Chinese Office action mailed Jun. 10, 2010 in related Chinese Patent Application No. 200610109167.7, (4 pages); English Translation (8 pages).
Chinese Office Action mailed Jun. 21, 2010 in related Chinese Patent Application No. 20050005149.8. (4pages); English Translation (6 pages).
U.S. Notice of Allowance mailed Jun. 21, 2010 in related co-pending U.S. Appl. No. 11/045,484, (In English).
U.S. Notice of Allowance mailed May 19, 2010 in related co-pending U.S. Appl. No. 10/628,583, (In English).
U.S. Notice of Allowance mailed Mar. 22, 2010 in co-pending U.S. Appl. No. 11/488,178.
Steves, Douglas "Overview on Secure Transaction Protocols" <URL: http://www.usenix.org/publications/library/proceedins/ec96/full_papers/steves/html/node.5htm#SECTION00021000000000000>, May 4, 1997 (1 page article).
European Search Report Communication issued by the European Patent Office on Nov. 15, 2007 in the related European Patent Application No. 03254926.3 — 1244 (3 pages).
Korean Office Action issued by the Korean Intellectual Property Office on Nov. 8, 2007 in related Korean Patent Application No. 10-2006-7019071 based upon PCT/US2005/004049 (4 pages) (English translation consisting of 4 pages).
U.S. Office Action mailed Dec. 7, 2010 in related U.S. Appl. No. 10/628,569.

* cited by examiner

End of Voting

US 7,877,605 B2

OPINION REGISTERING APPLICATION FOR A UNIVERSAL PERVASIVE TRANSACTION FRAMEWORK

CROSS-REFERENCE TO RELATED APPLICATIONS

This application is related to, and claims the benefit of and priority to, Provisional Application U.S. Ser. No. 60/541,903, entitled AN OPINION REGISTERING APPLICATION, by Yannis Labrou, Lusheng Ji, Jesus Molina Terriza, and Jonathan Agre, filed Feb. 6, 2004 in the U.S. Patent and Trademark Office, the contents of which are incorporated herein by reference.

This application is related to U.S. Provisional Application No. 60/401,807, filed Aug. 8, 2002, entitled "Methods and Apparatuses for Secure Multi-Party Financial Transactions", the contents of which are incorporated herein by reference.

This application is related to U.S. application Ser. No. 10/458,205, filed Jun. 11, 2003, entitled "Security Framework and Protocol for Universal Pervasive Transaction", the contents of which are incorporated herein by reference.

This application is related to U.S. application Ser. No. 10/628,583, filed Jul. 29, 2003, entitled "Framework and System for Purchasing of Goods and Services", the contents of which are incorporated herein by reference.

BACKGROUND OF THE INVENTION

1. Field of the Invention

The present invention is related to an opinion registering application in a Universal Pervasive Transaction Framework, an example of which is voting, and more particularly, to an application that requires a transaction to be multi-coded so that the identity of a user and the content of the transaction cannot both be known by any single device, other than the device in which the transaction is input, within or outside of the network.

2. Description of the Related Art

Electronic-voting ("e-voting") applications are well known in the art and have several desirable characteristics such as convenience of voting or opinion registering, non-human computation or tallying of votes, faster processing and voting times, and flexibility. However, e-voting, as with most Internet-type transaction, is prone to security violations, inaccuracy, and integrity issues.

E-voting is not like any other electronic transaction. There are two main types of e-voting: polling place e-voting, and remote e-voting.

Remote e-voting is the unsupervised use of an Internet voting device to cast a ballot over the Internet using a computer not necessarily owned and operated by election personnel. Authentication of the voter relies on computer security procedures, but includes some form of identity verification that is at least as secure as existing voting procedures. Remote e-voting is highly susceptible to voter fraud.

Polling place e-voting is defined as the use of Internet Voting Machines at traditional polling places staffed by election officials who assist in the authentication of voters before ballots are cast.

Several cryptography methods have been developed and/or are being used to ensure secrecy and security with regards to e-voting so that e-voting may be reliably used for voting in municipal, regional, or national elections.

Essentially, a polling station computer confirms to a voter that a valid vote has been cast, and also provides a receipt. This paper receipt has an encoded code on it derived from a central computer. After the election, the voter can confirm that his/her vote was counted, for example, by checking a particular Web site to make sure that their receipt's sequence corresponds to those that have been posted, or asking an organization that they trust to do the verification.

For instance, most polling place e-voting applications involve the following type of security: (1) the voter constructs an "anonymous electronic ballot"; (2) the voter shows adequate proof of identity to an election authority; (3) the election authority "stamps" the ballot after verifying that no other ballot has been stamped for this voter; and (4) the voter anonymously inserts the ballot into an electronic mail box.

Current e-voting applications are not secure or reliable. Voters are often required to vote from specific e-voting type voting equipment. Voters are not able to vote wirelessly from a Universal Pervasive Transaction Device, such as a PDA or cell-phone, in a secure manner such that the voting action can be authenticated but without any third party or device knowing the content of the vote of that specific individual. Further, there is no way to ensure that the voting action transaction can transpire without any third party or device knowing the content of the vote of a particular voter.

SUMMARY OF THE INVENTION

According to an aspect of the present invention, there is provided a computer-based system securely transmitting and authenticating a transaction input by a user while retaining the anonymity of the user with respect to content of the transaction, including a first device, where the content of the transaction is input and submitted to a second device, the second device encoding the content of the transaction that is input at the first device with a code key $K_{VSi}$, sending the content of the transaction that is encoded with the code key $K_{VSi}$, to the first device, the first device generating a first message by further encoding the content of the transaction that is encoded with the code key $K_{VSi}$ with a respective UPTF-SAS key, and the second device generating a second device encoded message by further encoding the content of the transaction that is encoded with the code key $K_{VSi}$ with a respective UPTF-SAS key, a third device receiving the encoded messages of the first and the second device, decoding the received encoded messages to authenticate an identity of the user of the first device, matching the decoded messages to authenticate an occurrence of the transaction, and forwarding the encoded content of the transaction that is encoded with the code key $K_{VSi}$ to a fourth device, and the fourth device receiving the encoded content of the transaction encoded with the code key $K_{VSi}$ and using the code key $K_{VSi}$ to determine content of the transaction input by the user of the first device.

According to an aspect of the present invention, the second device and the fourth device agree on the code key $K_{VSi}$, or a public key cryptographic key pair, prior the transaction being transmitted in the computer-based system, and the third device sends identifying information of the corresponding second device to the fourth device so that the fourth device can retrieve the code key $K_{VSi}$ of the second device to decode the content of the transaction that is encoded with the code key $K_{VSi}$.

According to an aspect of the present invention, the second device cannot determine the identity of the user that input the content of the transaction because when the content of the transaction is input at the first device and submitted to the second device, the first device does not transmit user identifying information to the second device, and because in the first message generated by the first device, the identity of the user is encoded by the first device according to a coding technique that can only be decoded by the third device.

According to an aspect of the present invention, the third device cannot determine the content of the transaction input by the user but can determine whether a particular user input the content of the transaction at a particular second device, and the fourth device cannot determine the identity of the user that input the content of the transaction since the fourth device cannot determine the first device in which the content of the transaction was input by the user.

According to an aspect of the present invention, the third device authenticates the identity of the user of the first device after successfully decoding the encoded messages of the first and second device by reconstructing the UPTF-SAS keys of each of the first and second devices since the third device knows the parameters of the coding algorithms used to produce the respective UPTF-SAS coding keys, and the occurrence of the transaction is authenticated by matching content of the successfully decoded messages of the first and second device according to a UPTF-SAS protocol.

According to an aspect of the present invention, the user is authenticated to operate the first device according at least one biometric feature of the user or a personal identification number.

According to an aspect of the present invention, the transaction of the computer system is performed between the first and the second device, the transaction is an opinion registering application, and the content of the transaction is a ballot.

According to an aspect of the present invention, there is one or more first device and one or more second device.

According to another aspect of the present invention, there is a virtual private network located between the second device and the fourth device and another virtual private network located between the third device and the fourth device.

According to another aspect of the present invention, there is provided a computer-based system securely transmitting and authenticating a transaction input by a user while retaining the anonymity of the user with respect to the content of the transaction, including a first device generating an encoded message, including a user input content portion, according to UPTF, a second device further encoding the user input content portion of the encoded message with a coding key $K_{VSi}$ and generating a second device encoded message corresponding to the transaction according to UPTF, a third device receiving, decoding, and comparing the encoded messages of the first and second device to authenticate an identity of the user of the first device and to authenticate an occurrence of the transaction, and forwarding the encoded content of the transaction encoded with the code key $K_{VSi}$, and a fourth device receiving the encoded content of the transaction encoded with the code key $K_{VSi}$ and using the code.

According to an aspect of the present invention, the coding algorithm used for further encoding the user input content portion of the encoded message with the coding key $K_{VSi}$ is commutative with the algorithm used by the first device to generate the encoded message.

According to an aspect of the present invention, the second device message does not include the user input content portion.

According to an aspect of the present invention, the second device and the fourth device agree on the code key $K_{VSi}$, or a public key cryptographic key pair, prior the transaction being transmitted in the computer-based system, and the third device sends identifying information of the corresponding second device to the fourth device so that the fourth device can retrieve the code key $K_{VSi}$ of the second device to decode the user input content portion of the encoded message encoded with the coding key $K_{VSi}$.

According to an aspect of the present invention, the third device cannot determine the user input content portion of the transaction, and the fourth device cannot determine the identity of the user that input the user input content portion of the transaction.

According to an aspect of the present invention, the third device authenticates the identity of the user of the first device after successfully decoding the encoded messages of the first and second device by reconstructing the UPTF keys of each of the first and second devices since the third device knows the parameters of the coding algorithms used to produce the respective UPTF coding keys, and the occurrence of the transaction is authenticated by matching content of the successfully decoded messages of the first and second device according to a UPTF-SAS protocol.

According to yet another aspect of the present invention, there is provided a computer-based system securely transmitting and authenticating a transaction input by a user while retaining the anonymity of the user with respect to the content of the transaction, including a first device receiving from a second device a reference number, which relates to a not yet input transaction, the first device generating a first encoded message after the transaction, which is a user input content portion, is input by the user at the first device, such that the first encoded message includes the user input content portion that is encoded with a random code key $K_V$, the first device generating a second encoded message including, which includes the random code key $K_V$ and the reference number, and sending the first and second encoded messages to the second device, the second device storing the first encoded message, forwarding the second encoded message to a third device, and generating a third encoded message including the random code key $K_V$ and the reference number and not containing the user input content portion, the third device receiving the second and third encoded messages, which do not have the user input content portion, decoding the messages to authenticate an identity of the user and matching content of the second and third decoded messages to authenticate an occurrence of the transaction, and forwarding the code key $K_V$ and the reference number to a fourth device, and the fourth device receiving from the second device the first encoded message and the reference number, receiving from the third device the random code key $K_V$ and the reference number, and determining from the received information the user input content portion of the transaction input by the user.

According to an aspect of the present invention, the first encoded message is stored in a database of the second device and is not sent to the fourth device to be decoded until the third device has verified the identity of the user and the occurrence of the transaction.

According to an aspect of the present invention, the third device never receives the user input content portion of the transaction input by the user, and the fourth device cannot determine the identity of the user that input the user input content portion of the transaction.

According to an aspect of the present invention, the user input content portion of the transaction is encoded whenever sent from the first device to any other device in the computer-based system, wherein the third device never receives the user input content portion of the transaction, and wherein there is an accounting for the transaction input by the user so that errors may be located.

According to still another aspect of the present invention, there is provided a computer-based system securely transmitting and authenticating a transaction input by a user while retaining the anonymity of the user with respect to content of the transaction, including a device encoding the content of the transaction input by the user with a key known only to another device, encoding other portions of the transaction with another key known only to a secure transaction server, and sending the encoded content of the transaction and the encoded other portions of the transaction to the secure transaction server to authenticate an identity of the user of the device, wherein the secure transaction server decodes the other portions of the transaction and sends the encoded content of the transaction to the another device to be finally decoded.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
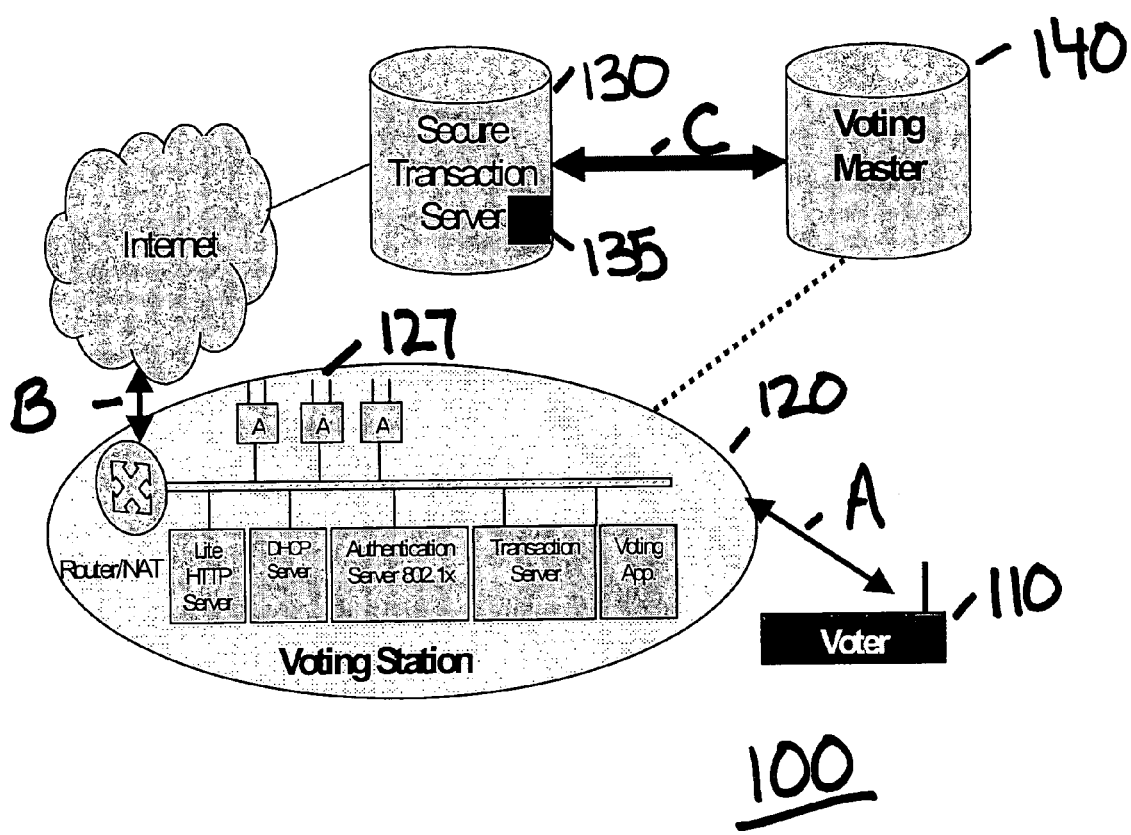
FIG. 1 is a functional block diagram of Universal Pervasive Transaction Framework system architecture according to an embodiment of the present invention.

The present invention will now be described more fully with reference to the accompanying drawings, in which a preferred embodiment of the invention is shown. In the drawings, like reference numerals are used to refer to like elements throughout.

The present invention is a computer-based system, apparatus, and method presenting a new concept for authenticating a transaction with a user in a Universal Pervasive Transaction Framework ("UPTF"). Specifically, the present invention relates to an opinion registering application, an example of which is voting.

The present invention is described in terms of the way that it extends the UPTF scheme to an opinion registering application.

Prior to presenting a description of the present invention, a brief overview of the UPTF is presented with reference to FIG. 1. The UPTF is explained in detail in U.S. Provisional Application No. 60/401,807, U.S. application Ser. No. 10/458,205, and U.S. application Ser. No. 10/628,583, the contents of which are all incorporated herein by reference.

UPTF technology may be used in a variety of other applications, such as market transactions to enable consumers to wirelessly purchase goods and services when in proximity to the location where the goods and services are offered.

Pervasive transactions typically takes place in environments with multiple access points, multiple users, multiple services and many transactions occurring in parallel. In addition, there may be eavesdroppers, unauthorized services and masquerading users. Thus, the goals of the UPTF are to authenticate a party involved in the transaction and prevent various attacks targeted at both the device and the communication levels of the pervasive transaction system. These goals may be accomplished having a coding scheme or security scheme that is symmetrical between the user and the other transaction party.

FIG. 1 is a functional block diagram of UPTF system architecture to execute a transaction for an opinion registering application, according to an embodiment of the present invention. The UPTF defines a system architecture and a communication security protocol, called the Secure Agreement Submission (SAS) protocol. Essentially the UPTF offers a vessel, which is able to securely carry the individual views of a transaction agreement from each party involved in the transaction to a trusted third party for verification, using a communication network which may consist of insecure segments such as wireless LANs or cellular links.

The UPTF SAS protocol will encode the messages using a symmetric, shared-secret-key approach where the secret key is known only to an individual party and a trusted third party or device. The SAS insures that the authenticity of the parties is verified and during delivery, the privacy of the information is preserved, even when the parties distrust each other and the messages from one party may be forwarded by the other to the third party verification. The UPTF also provides the mechanism for the trusted third party or device to verify that the independent views of the agreement are consistent with each other.

After the agreement data is extracted from the views received from the parties and the data is verified by the trusted third party, further actions may need to be taken to actually execute the agreement.

The architecture for the UPTF system shown in FIG. 1 includes a voter operating a UPTF device (called a UPTD), such as a mobile phone, called a Voter Device 110, a Voting Station 120 operating as another UPTF device, a Secure Transaction Server (STS) 130, a Voting Master 140, and several communication channels among them. The Voter Device 110, which is typically a mobile device, interacts with the Voting Station 120 to determine the details of a transaction and executes the UPTF protocol and its corresponding security operations SAS. The Voting Device 110 can support wireless communication capability necessary for discovering the Voting Station 120, communicating with the Voting Station 120, and communicating with the STS 130, as necessary.

The Voting Device 110 can also have a user interface for interacting with the Voting Station 120 through some common application and the STS 130 as needed. The Voting Station 120 can also operate a UPTD and is responsible for interacting with the Voter Device 110, executing the UPTF protocol and its corresponding security operations and interacting with the STS 130.

According to an aspect of the embodiment described herein, the STS 130 is a backend verification server on which both the Voter Device 110 and the Voting Station 120 have registered and provided identifying account information that is maintained in a STS database 135, which is preferably secure. The secret information used for encoding the messages to/from each Voter Device 110 and Voting Station 120 may also be stored in the STS database 135.

The STS 130 receives independently generated UPTF SAS transaction views (described in more detail further below) from both the Voter Device 110 and the Voting Station 120 regarding the transaction conducted between them. The STS 130 is able to decode both of the views using information from UPTF SAS messages and the information stored in the STS database 135. Following successful decoding, the STS 130 verifies that the view messages are original, authentic, involve the intended Voter Device 110 and Voting Station 120, and that the information fields in the agreement views are consistent with each other. The STS 130 may also maintain a log of all messaging activity for non-repudiation purposes.

In FIG. 1, a generic set of communication channels are explicitly shown. Channel A represents the link between the Voter Device 110 and the Voting Station 120. This link is used to negotiate the details of a transaction between the Voter Device 110 and the Voting Station 120. This aspect is application dependent and is not considered to be part of the UPTF framework. Channel A may or may not exist, if it exists it can be a wireless channel, for example, in case of a wireless local area network ("WLAN") enabled mobile phone, and/or channel A can be physical communication between the voter and Voting Station 120 in case that the voter does not vote via the Voter Device 110. Channel B is an example of a link between the Voter Station 120 and the STS 130. Most often, channel B is not a direct link, but involves communicating through a mobile communications network and/or the Internet. In general, these are insecure channels. Channel C, from the STS 130 to the Voting Master 140 is a different type of channel and is assumed to be a highly secure communication path. In addition, STS 130 itself is assumed to be housed in a protected facility so that the STS database 135 is physically secure and inaccessible from the network.

In the above-UPTF configuration, the voter is a user entering or submitting information to the Voting Station. Voting, e.g., opinion registering, is only one example of the type of information that may be submitted by the user. Likewise, the designations given to the Voting Device, Voting Station, and Voting Master are arbitrary descriptions and are not intended to limit the application of the Universal Pervasive Transaction Framework (UPTF) system architecture. The Voting Station is included to mimic conventional voting practice in which local control of the ballot distribution and local verification of the identity of the voter are desired.

Figure 2:
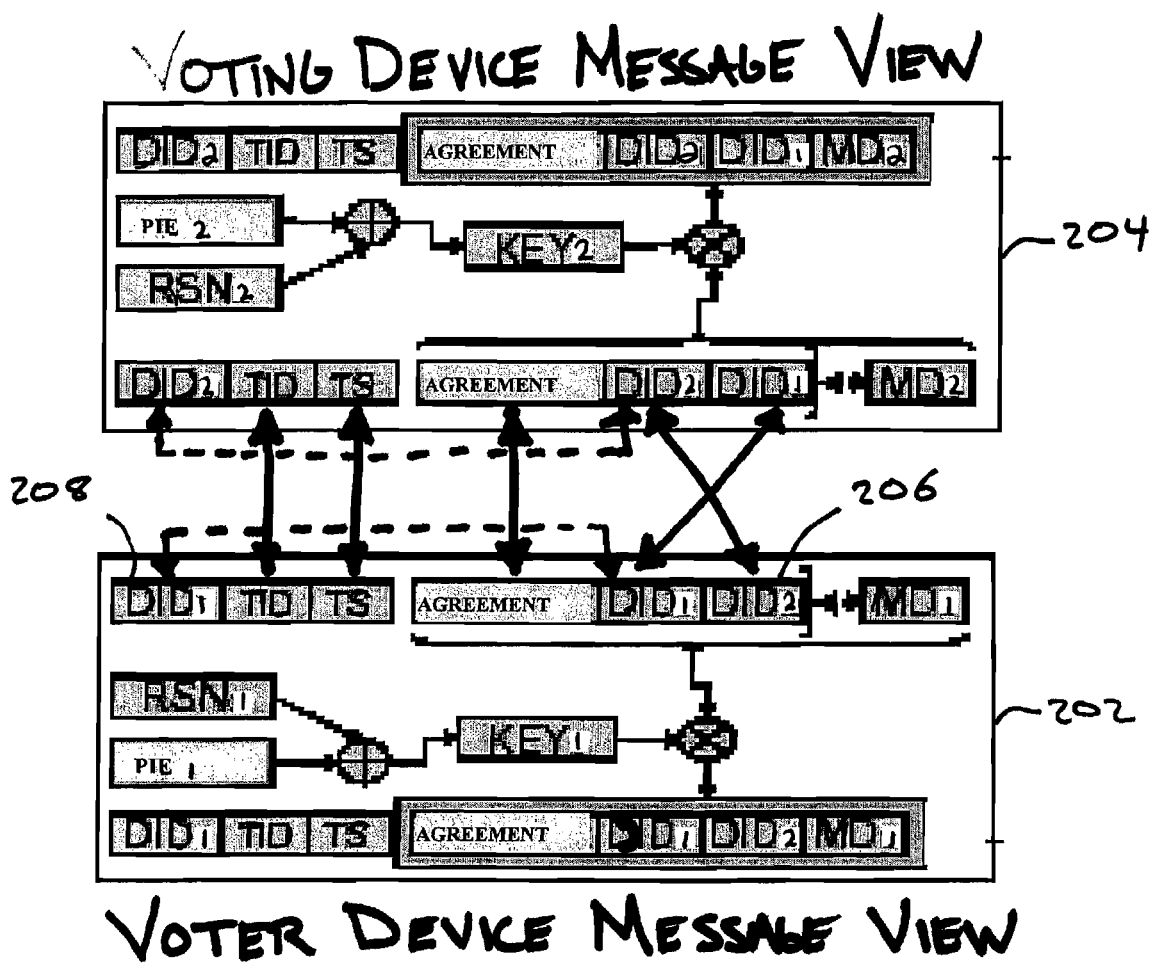
FIG. 2 is a diagram of Universal Pervasive Transaction Framework transaction messages based upon a Secure Agreement Submission ("SAS") protocol.

FIG. 2 is a diagram of UPTF transaction messages based upon a Secure Agreement Submission ("SAS") protocol to execute an opinion registering application. The SAS protocol of the UPTF is more fully described in U.S. patent application Ser. No. 10/458,205, filed Jun. 11, 2003, entitled "Security Framework and Protocol for Universal Pervasive Transaction", the contents of which are incorporated herein by reference.

An overview of an embodiment of the SAS protocol is now presented.

The Security Agreement Submission (SAS) protocol verifies a transaction in the UPTF opinion registering application scheme. An aspect of the present invention is an SAS encoding (SASE) mechanism that provides many security properties in an insecure communication environment. The SASE encodes and decodes all messages that are part of the SAS. The SASE mechanism may be implemented by each of the agreement parties, e.g., Voter Device 110, and Voting Station 120, and at least one verification party, e.g., STS 130. It is understood that encoding refers to a type of encryption, e.g., coding data such that a key is needed to read the data, and decoding refers to a type of decryption, e.g., transforming encoded data into equivalent plain text using the same or related key.

The SAS protocol achieves the following desirable security properties:

Authentication of agreement parties: The identities of the involved agreement parties can be determined to be who they claim they are, to a high degree of likelihood by the verification party, based on the fact that a SASE encoded message sent by an agreement party can be decoded and understood by the verification party, using a decoding method with a key that is specific to the sender and only known to the verification party and the specific agreement party.

Authentication of verification party: The identity of the verification party can be determined to be who it claims it is, to a high degree of likelihood by each individual agreement party, based on the fact that a SASE encoded message sent by the verification party for a particular agreement party can be decoded and understood only by that agreement party using a decoding method with a key specific to the agreement party and only known to the agreement party and the verification party;

Anonymity: The agreement parties may remain anonymous to each other, if desired in an application through the use of the SASE method.

Privacy of Agreement: The agreement data sent between the agreement parties and the verification party is protected by SASE so that, if intercepted, no party other than the intended receiver is able to decode and read the data. Similarly, response messages from the verification party to the agreement parties may also be protected.

Tamper-resistance: The agreement data sent between the agreement parties and the verification party may be protected through the use of an encryption signature so that no party can alter the data sent by other parties without a high degree of detection.

Non-replayable: Agreement data sent between the agreement parties and the verification party (if intercepted) may be protected by any standard encoding mechanism by using the key only once and including a value that is only used once by the sender and encoded in the view. For example, the encoding mechanism may incorporate the value of the time when the agreement transaction occurs, and such a timestamp is also included in each message and recorded by the verification party. Thus, no party can replay the agreement data to forge a new agreement because each key is associated with a specific timestamp, which is recorded by the verification party in a message log. Therefore, since the STS 130 logs or records messages according to a specific time stamp, the STS 130 will identify the agreement data or transaction according to the time stamp for each message.

Non-repudiation: An agreement party cannot later claim that they did not generate an agreement message that has been verified by the verification party except under certain specific conditions, which are highly unlikely. These security breaches might include a situation where all of the secret parameters (the device-specific stored parameters and the shared secret which is input by the user of the device) have been divulged or discovered and the UPTD (Voter Device 110) has been used without the consent of that agreement party. It is also possible for the verification party to generate a false agreement, but it would involve the collusion of the verification party and the other parties to the agreement, which is also highly unlikely. In addition, the verification party will keep records that record the sequence of SAS message exchanges involved in each transaction.

Agreement Group Authentication: The present invention ensures the integrity of the agreement party group (the group consisting of and only of the parties among which the agreement is conducted) so that no other party may pretend to be an agreement party or an agreement party can pretend not to be an agreement party. This is accomplished explicitly by a membership list and identity cross-referencing. It is also assumed that all participants in the agreement are previously known to the verification party and able to be individually authenticated. For example, a verification party sends a message to all who are eligible to participate in an opinion registering application and identifies each eligible participant who actually participated in the opinion registering application by cross-referencing each actual participant with the membership list.

Agreement Verification: The agreement is verified to be consistent among the authenticated agreement parties through the use of redundant and cross-referencing information contained in the agreement data from each party and the use of a verification procedure consisting of basic matching rules and specific matching rules that may depend on the application.

Computational Efficiency: The security mechanism of the present invention is based on private key (symmetric) cryptography that is more efficient than alternative methods.

Physical Security: The security mechanism may be implemented so that it is not necessary to store all of the necessary encoding information on the UPTD or Voter Device 110, thus making it easier to protect the secret information if the Voter Device 110 is compromised. Specifically, the shared secret input by the user or voter is not stored on the Voter Device 110. Also, when the Voter Device 110 is used in a particular application context, user-identifying information is not stored on the Voter Device 110. For example, when the Voter Device 110 is used for submitting an opinion registering transaction, the name of the voter, or the voter's account information is not stored on the Voter Device 110.

Intrusion Detection: The security mechanism is centralized through the use of an independent verification party so that attempts to use the system by unauthorized users that rely on multiple access attempts are easily detected and handled accordingly.

With the above-mentioned aspects of the present invention, the present invention is ideal for being used as a vessel to carry opinion registering transaction data in an insecure communication environment.

The following includes additional details of the SAS protocol of the UPTF and the encoding mechanism provided with reference to FIG. 2, for example.

The internal structure and the generation process of message views 202, 204 (e.g., UPTF SAS transaction messages) are shown in FIG. 2. The UPTF SAS based message views 202, 204 are implemented and executed by software and/or hardware of the Voter Device 110. Since the message views 202, 204 from the Voter Device 110 and the Voting Station 120, respectively, are symmetrical, the voter device message view 202 is only described. The symbols used in FIG. 2 are explained below:

$DID_1$: device ID, a unique identifier for the Voter Device 110.

$DID_2$: device ID, a unique identifier for the Voting Station 120.

RSN: random sequence number.

TS: local current timestamp.

TID: transaction ID, a unique identification number assigned to an agreement.

MD: message digest.

PIE: Personal identification entry, a user, e.g., voter, and STS 130 maintained input secret entry, such as an alphanumeric string. In a typical embodiment described herein, the PIE is only maintained by the user (voter) and the STS 130, is not known to and/or maintained by another party and/or the Voting Master 140, and is temporally known as an intermediate parameter to the Voter Device 110 for encoding the voter device message view 202. The PIE can be a short alphanumeric string, such as a 4 digit number. The PIE is entered by the user whenever the user attempts a transaction. Preferably the PIE is issued to the user following the registration of the user for the application that the Voter Device 110 is used for. The PIE can also be selected by the user at such time. The PIE is an alphanumeric string. In order to speed up the user entry to make it easier for the user to remember the PIE, the PIE can be a number such as 4-digit or 5-digit personal identification number ("PIN"). The PIE is, however, a piece of highly secure information in the sense that the PIE is never transmitted during the UPTF protocol execution, the PIE is only known to the user and the STS 130, and secrecy of the PIE is well protected. It is assumed that the PIE can be input by the user on a Voter Device 110 in a secure fashion or it may be deterministically generated using a biometric device, such as a fingerprint sensor. For example, a computation applied on the fingerprint data received from a fingerprint sensor can be used to generate a PIE that is initially communicated by the user to the STS 130. Whenever the user attempts a transaction, the user applies her finger to the fingerprint sensor, thus generating the PIE. The PIE should not be kept in permanent storage on the Voter Device 110, but can be used as an intermediate parameter required for the generation of the encoding key for a transaction. The PIE should not be retained by the Voter Device 110 for a period longer than the transaction execution time. If a particular implementation of the present invention uses a form of PIE that is not convenient for a user to input for each agreement transaction and the Voter Device 110 needs to store the user's PIN, the storage must be secure and tamper-resistant.

As shown in the FIG. 2, a voter device message view 202 comprises a cipher text portion (or encoded portion) 206 and a plaintext (e.g., perceptible) portion 208. A plaintext portion 208 includes the TID, the $DID_1$ of the Voter Device 110 generating the voter device message view 202, and the local current TS of Voter Device 110. The TS is used to prevent transaction replay. The encoded portion 206 comprises two critical fields: the agreement data and the $DID_2$ of the Voting Station 120 involved in the agreement. The $DID_2$ is the minimum necessary reference field in order to provide the desired verification properties of the SAS protocol. Therefore, a user can execute a Voter Device 110 transaction with a transaction verification party (e.g., STS 130) using a PIE and transaction messages comprising an identifier of the Voter Device 110, an identifier of the second transaction party, e.g., Voting Station 120, and an identifier for a transaction.

For example, the DID, and the TS obtained from the local clock of the Voter Device 110 (and/or as provided as a part of the agreement data), are input to a pseudorandom number generator of the Voter Device 110 to generate a time-dependent RSN. Therefore, the parameters of the generator are particular to each Voter Device 110. The encoding key K is generated from the RSN and PIE, which is generated by the STS 130. The RSN and PIE are combined using a function F and a hash function H is applied to the result (typically a string) to generate the encoding key:

$$K=H(F((PIE,RSN))$$

A message digest function can be applied to the agreement data, the $DID_2$, and the DID, to generate a MD of the view. The MD can further strengthen the security by ensuring that no other party has tampered with or modified the contents of the voter device message view 202 in any way. The encoding algorithm with the encoding key K is applied to the MD, the agreement data, the $DID_1$, and the $DID_2$ to generate the cipher text portion of the voter device message view 202, as shown in FIG. 2. For further protection, the SAS protocol may use additional encoding standards to prevent "known-text" attacks.

The STS 130 has sufficient prior knowledge of the functions and specific parameters used by each Voter Device 110 in the encoding process, so that when combined with the plaintext portions of a message view 202, 204, it is possible to decode the message view 202, 204 by reversing the above process. For example, from the plaintext portion 208 of the voter device message view 202, the STS 130 recovers the DID, and TS, which are used to look-up the voter PIE and other parameters of the RSN generator that can be stored in the STS database 203. These are used to compute the RSN. The encoding key K can be computed using the same method with which the Voter Device 110 generates the encoding key. The cipher text portion 206 of the voter device message view 202 is then decoded.

After all fields of the voter device message view 202 are acquired, the STS 130 locates the voting station message view 204 for the same transaction, using the $DID_2$ and TID included in the previously decoded voter device message view 202. After going through a similar decoding process, the decoded fields of the agreement data of the voting station message view 204 are compared with the corresponding fields from the voter device message view 202. If all the corresponding fields match, the received message views 202, 204 are considered verified. Further processing is carried out and external executions are triggered as necessary.

Any responses from the STS 130 to the Voter Device 110 or Voting Station 120 are encoded by the STS 130 using the same encoding methods and using the parameters for the encoding of the original transaction at the Voting Device 110. Only the intended user can decode the response message, insuring privacy protection and authentication of the STS.

For a complete account of the encoding key generation for the UPTF SAS describe above, refer to U.S. Provisional Application No. 60/401,807, U.S. application Ser. No. 10/458,205, and U.S. application Ser. No. 10/628,583, the contents of which are incorporated herein by reference.

A detailed description of the present invention is now presented.

The embodiments of the present invention are described in terms of applications, such as an opinion registering application, which may be implemented using the UPTF described above. Each of the applications discussed below that may be implemented using a similar framework, devices, architecture, and overall framework as described above for the UPTF. The modifications, for example, of the UPTF concern the notion of a transaction and an extension to the overall architecture that guarantees the anonymity of the UPTD's owner, such as the user of a mobile phone, who submits the transaction using the mobile phone.

Figure 3:
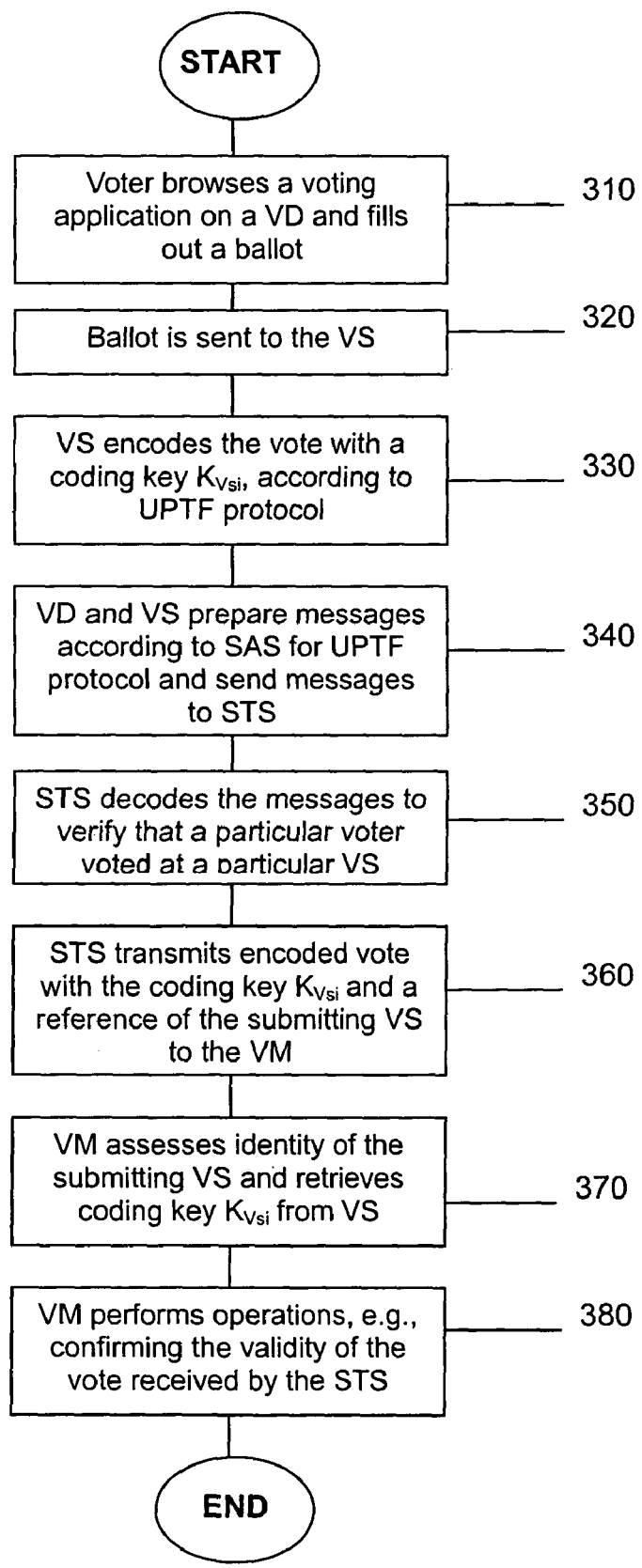
FIG. 3 illustrates how views are processed in the Universal Pervasive Transaction Network scheme according to an embodiment of the present invention.

According to an embodiment of the present invention, referring to FIGS. 1 and 3, a voter downloads a voting application and executes a voting application that is offered by the Voting Station 120 on a UPTD Voter Device 110 ("Voter Device") and selects a ballot to be filled (operation 310). The ballot is submitted to the Voting Station 120 (operation 220). Preferably, the ballot is securely submitted to the Voting Station 120 so that a third party cannot determine the voter, e.g., registered user of the Voting Device 110, and content of the ballot being submitted. The Voter Device 110 may encrypt the ballot so that its contents are hidden from the Voting Station 120.

The voter may be any user of the opinion registering application implemented using the UPTF. Again, the voting application is not limited to a voting application and includes any application, e.g., survey, opinion poll, requiring a user to submit information on a form to be transmitted. Further, the present invention is not limited to there being only one voter and only one Voting Station 120. For example, there may be multiple voters submitting ballots to a single Voting Station 120 or Voting Stations 120.

The Voting Station 120 further encodes the vote with a coding key $K_{Vsi}$, which is generated by the Voting Station 120 according to an encoding method of the UPTF protocol (operation 330). The encoded vote with the coding key $K_{Vsi}$ is referred to as the agreement (transaction) in the UPTF scheme.

The Voting Station 120 and the Voter Device 110 both prepare messages for the STS 130 according to, for example, the above described SAS protocol for the UPTF scheme (operation 340). The encoded portions of the messages prepared by the Voter Device 110 and the Voting Station 120 are encoded with the two parties respective keys (hashes of the RSN and the corresponding PIN's), which are only known, or can only be inferred, by the STS 130. However, the portion of the message that is the encoded ballot cannot be decoded by the STS 130. The encoding of the encoded portions of the messages is not limited to the above-described encoding mechanism.

The STS 130 receives the messages prepared by the Voting Station 120 and the Voting Device 110 via a communication link. The STS 130 decodes the received messages to verify that a particular voter voted at a particular Voting Station 120 (operation 350). Upon such determination, the STS 130 sends the agreement (encoded vote with the coding key $K_{Vsi}$ and a message digest) and a reference of the submitting Voter Station 120 to the Voting Master 140 (operation 360).

The Voting Master 140 assesses the identity of the submitting Voting Station 120 and subsequently retrieves the corresponding coding key $K_{Vsi}$ from the submitting Voting Station 120 to be used to decode the vote (operation 370). The coding key $K_{Vsi}$ is transmitted via a secure communication link between the Voting Station 120 and the Voting Master 140 or is known a priori to the Voting Master 140. The coding key $K_{Vsi}$ is only known to the Voting Station 120 and the Voting Master 140 and the vote cannot be decoded, e.g., determined, without using coding key $K_{Vsi}$. In the case that the coding key $K_{Vsi}$ is not known a priori to the Voting Master 140, the key may be transferred to the Voting Master 140 immediately upon being generated by the Voting Station 120 or transferred to from the Voting Station 120 to the Voting Master sometime after the STS 130 sends the agreement to the Voting Master 140.

The Voting Master 140 performs various operations, such as confirming the validity of the vote received by the STS 130 (ensuring non-duplication of voting and using the message digest for tamper detection) (operation 380). Further, the STS 130 may send a confirmation message of the voting operation to the Voter Device according to the UPTF protocol discussed in U.S. Provisional Application No. 60/401,807, U.S. application Ser. No. 10/458,205, and U.S. application Ser. No. 10/628,583.

According to the above-described embodiment of the invention, it is assumed that the STS 130 and the Voting Master 140 are not in collusion. For example, the STS 130 cannot determine the vote because the STS 130 cannot decode the agreement without the coding key $K_{V_{si}}$. The Voting Master 140 cannot determine the identity of the voter that submitted the ballot because the Voting Master 140 cannot determine the Voter Device 110 in which the ballot was submitted. Should there be collusion between the STS 130 and the Voting Master 140, any secrecy could be compromised because the STS 130 will additionally know the content of the vote or ballot and the Voting Master 140 will additionally know the identity of the voter that submitted the ballot.

Further, according to the above-described embodiment of the invention, a voter may authenticate self to the Voter Device 110 via a PIN or biometric features, e.g., fingerprints or retina scan. The STS 130 is able to confirm and/or record that a particular voter cast a vote at a particular Voting Station 120. The Voting Station 120 knows that a Voting Device 110 is submitting a vote, but has no knowledge of the identity of the registered owner of the Voting Device 110 (voter), thus only the DID, is known to the Voting Station 120. Only the STS 130 can resolve a DID, to its registered owner; however, the STS 130 cannot know the content of the vote because the vote has been encoded with a coding key $K_{V_{si}}$ that is unknown to the STS 130. The Voting Master 140 is able to decode and determine the content of a vote but is unaware of the identify of the voter who submitted the vote; instead, the Voting Master 140 only knows at which Voting Station 120 the vote was submitted.

According to the above-described embodiment of the invention, the UPTF framework assures the following:

Authentication of the voter;

Non-tampering of the vote, which preserves voting integrity;

Non-repudiation of the voting act, since the STS registers the origin of the vote, e.g., which Voting Station 120 and of the voter who submitted the vote; and Secrecy of the submitted vote since the vote is only known to the Voting Master 140, which is unaware of the identity of the voter who submitted the vote.

Further, during the browsing part of the above-described opinion registering application, for the purpose of the voter's selection and submission of the vote there is some normal security provided although it is not sufficient for the properties of the UPTF. For example, it may be the case that the over the air exchanged traffic is encoded at the link layer through security provided by a network protocol used between the Voter Device 110 and an access point of the Voting Station 120. But, if such traffic is not properly encoded, a third party could observe the votes traveling through the air. Although the third party would not be able to associate a specific vote to a voter using a particular Voter Device 110, since the voter's identity is never a part of the exchange, nor is the voter's identity communicated by the Voter Device 110 to the Voting Station 120. Nevertheless an additional application would be possible, namely a sampling a number of cast votes, similar to exit polls in today's systems.

According to another embodiment of the invention, the embodiments discussed above may be used in an e-government application. For example, this dual-purpose use of the UPTF framework would be beneficiary to the deployment of UPTF, especially by disseminating UPTD's in the hand of voters who also happen to be consumers.

As discussed above, the present invention significantly broadens the scope of applications of the UPTF. In addition, there are many benefits provided by the opinion registering application using UPTF described in the embodiments of the present invention. For example, the voting station is relatively easy to set up, the voting equipment is inexpensive and less personnel is necessary for carrying out the voting process, the process is flexible and fast for voters, parallelization of the voting actions (simultaneous voting), there is no waiting in line, and voters are not limited to voting in any one particular voting station.

Figure 4:
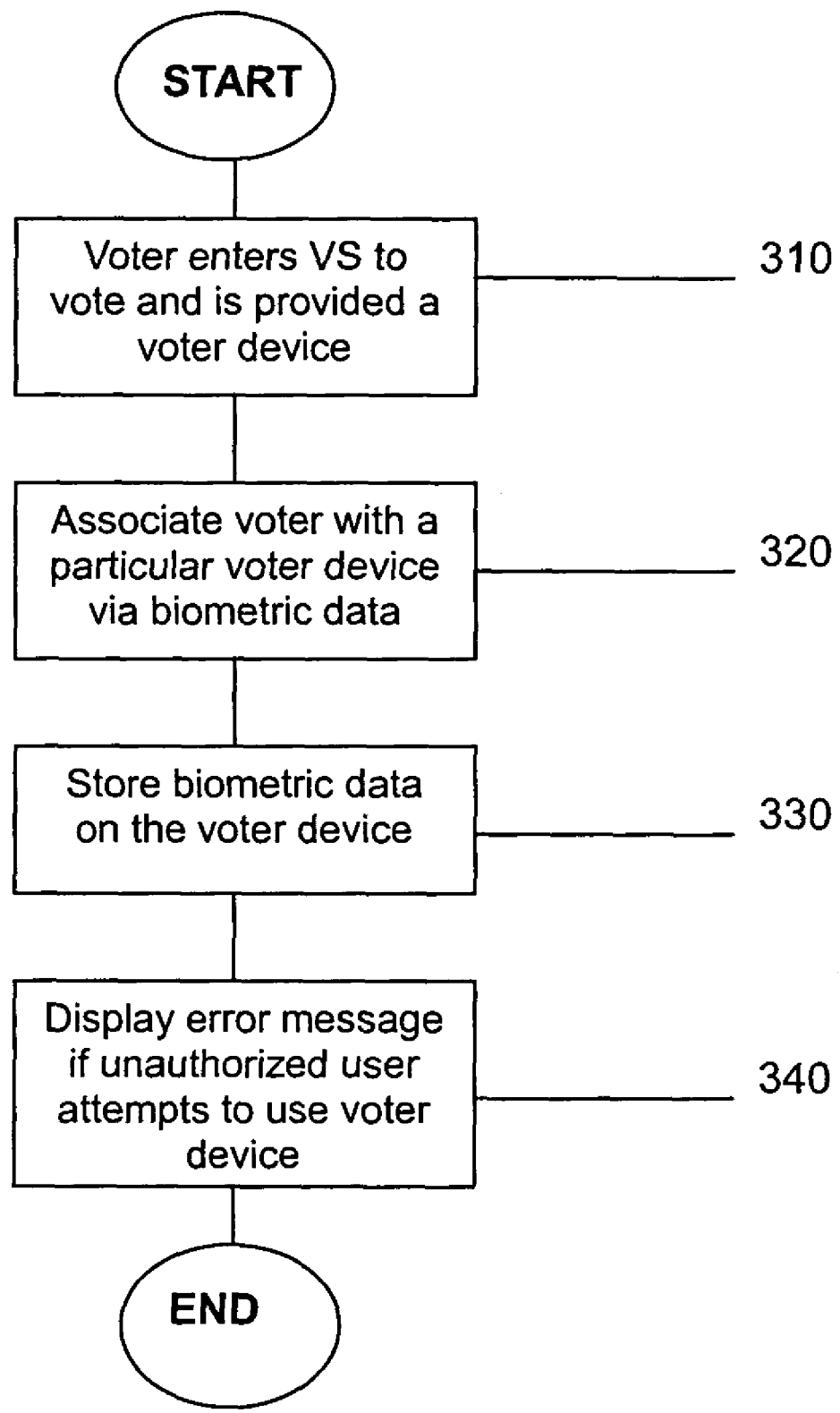
FIG. 4 is a flowchart of an opinion registering application of the Universal Pervasive Transaction Framework shown in FIG. 1 according to an embodiment of the present invention.

FIG. 4 is a flowchart of an opinion registering application of the UPTF shown in FIG. 1 and described in the above embodiments of the present invention.

In FIG. 4, operation 410 relates to an initial operation when a prospective voter visits a voting registration center and is given a Voter Device 110 to use for voting purposes. For example, the operation shown in FIG. 4 may occur during a polling station e-voting application.

In operation 420, biometric data of the voter is associated with a particular Voter Device 110. For example, the voter may have their fingerprint associated with a particular Voter Device 110. In operation 430, the biometric data is stored on the Voter Device 110 to be used for verification purposes when someone else attempts to activate or use the same Voter Device 110. Therefore, only a voter with a matching fingerprint can use the Voter Device 110. Further, the act of imprinting the fingerprint, or other biometric data, should take place in the presence of an official voting representative to confirm the identity of the voter attempting the imprint. The foregoing procedure will better guarantee the identity of the voter casting a vote using a particular Voter Device 110. The Voter Device 110 will display an error message if an unauthorized user attempts to use the Voter Device 110, as shown in operation 440.

Figure 5:
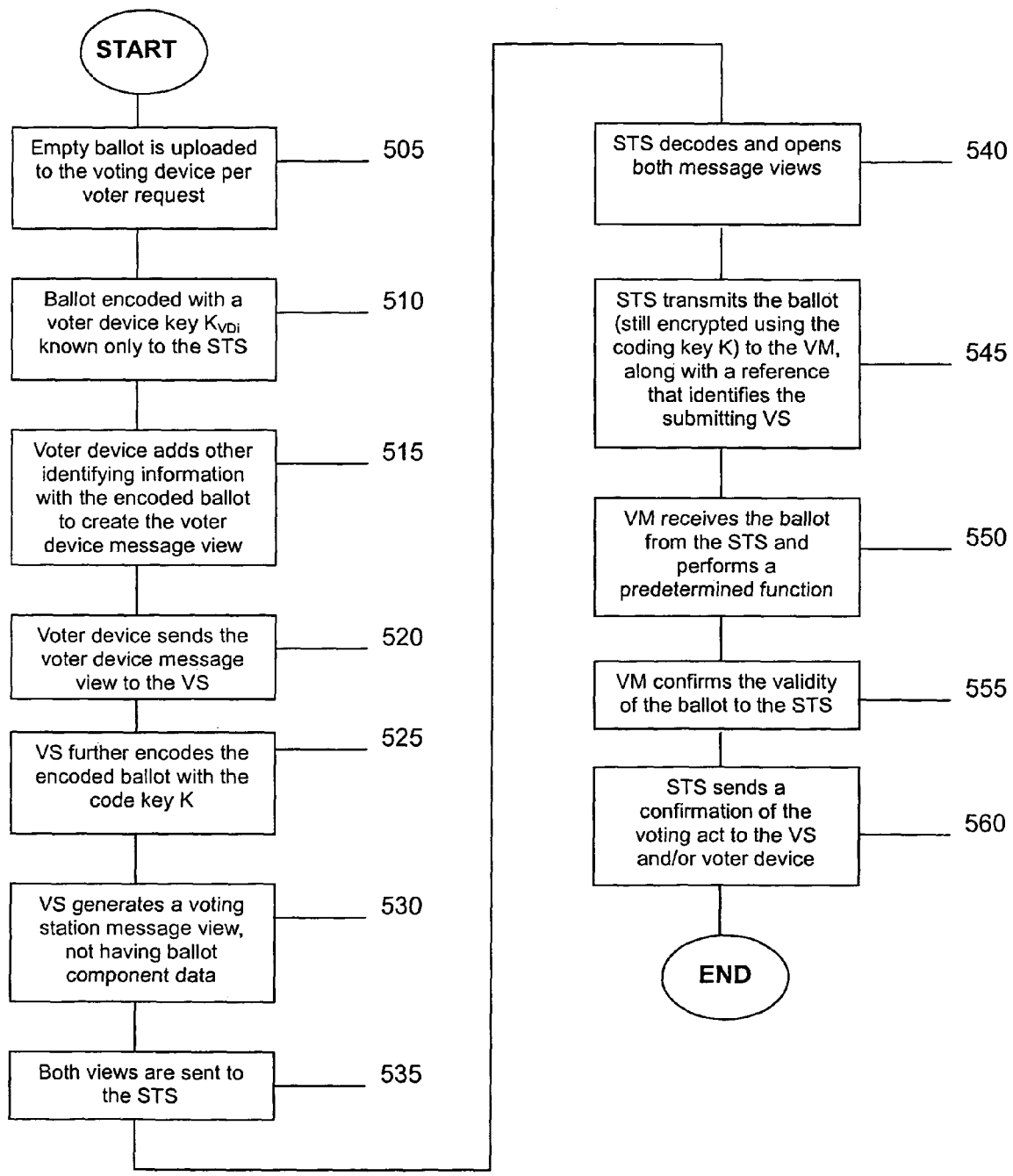
FIG. 5 is a method of performing an opinion registering application in a Universal Pervasive Transaction Framework, using the system architecture shown in FIG. 1, according to an embodiment of the present invention.

Another embodiment of the present invention, having similar devices, architecture, overall framework, and modifications over UPTF as in the embodiments discussed above, is described below and illustrated in FIGS. 1 and 5. FIG. 5 is a flowchart of another method of performing an opinion registering application in a UPTF using the system architecture shown in FIG. 1.

The modifications and properties discussed in the above-described embodiments are assumed to be present in the embodiments described below.

In FIG. 5, the voter browses the voting application at the Voter Device 110 and uploads or sends to the Voter Device 110 an application that represents an unfilled ballot or not-yet completed ballot (operation 505). The application is typically uploaded from the Voting Station 120. The voter fills the ballot using the Voter Device 110 (operation 510). It is assumed that no third party can see the voter filling the ballot at the Voting Device 110.

The Voter Device 110 separately encodes the ballot and the cross-reference identifying information for the Voting Station 120 with a voter device key known to the STS (operation 515). Such encoding is performed according to the UPTF protocol. For example, the voter device key may be generated using a hash of time-specific RSN and a user PIN. The voter device key is referred to as $K_{V_{Di}}$.

The Voter Device 110 adds or includes with the encoded contents the other self identifying information that are present in a typical voter device message sent to the STS 130. For example, the encoded contents of the typical voter device message comprise ballot and cross-reference identifying information and a message digest that is calculated from the contents. The Voter Device 110 sends this message, referred to as the voter device message, to the Voting Station 120 (operation 520). For example, the voter device message may also be received by the Voting Station 120 via communication access points 127, which provide wireless connectivity between the Voter Device 110 and the Voting Station 120. In another embodiment of the present invention, the message is transmitted as a message over a cellular network from a mobile phone.

The Voting Station 120 receives the voter device message and the Voting Station 120 encodes a portion of the already encoded ballot component again with a coding key $K_{VSi}$ (operation 525). The coding key $K_{VSi}$ is generated by the Voting Station 120 according to an encoding method of the UPTF protocol. The portion of the ballot that is further encoded is the vote. The encoded vote with the coding key $K_{VSi}$ is referred to as the agreement (transaction) in the UPTF scheme. This agreement (encoded vote) needs to be transmitted to the STS 130 either as the data portion of the voter device message or the voting station message. As one embodiment described further below discusses, the Voting Station 120 replaces the encoded ballot in the voter device message with the agreement. In an equivalent embodiment, the encoded ballot is deleted from the voting device message and is included as the agreement in the voting station message. In the following description, we assume the former approach.

The coding key $K_{VSi}$ generated is only known to the Voting Station 120 and the Voting Master 140 and the vote cannot be decoded, e.g., determined, without using coding key $K_{VSi}$. The coding key $K_{VSi}$ may be transferred to the Voting Master 140 immediately upon being generated by the Voting Station 120 or transferred to from the Voting Station 120 to the Voting Master sometime after the STS 130 sends the agreement to the Voting Master 140.

The encoded portion of the voter device message becomes "$K_{VSi}(STS\_K_{VDj}(ballot))+STS\_K_{VDj}$ (cross-reference identifying information)"; this modified message is used as the voter device message view which is sent to the STS 130. Similarly, this could also be used as the voter station message without loss of generality.

Briefly, a message view consists of an encoded portion and a plaintext portion. For example, with respect to the voter device message view, the encoded portion consists of reference identification information, such as $DID_2$, and agreement data (encoded vote with the coding key $K_{VSi}$), and a message digest to prevent tampering of the ballot, and the plaintext portion consists of additional reference identification information, such as transaction ID, Time Stamp, and $DID_1$.

Upon further encoding of the ballot received by the Voter Device 110, the Voting Station 120 generates a voting station message view using a predetermined mechanism and format according to the SAS protocol of the opinion registering application of the UPTF (operation 530). For example, the Voting Station 120 generates the voting station message view using the same mechanism and format as the merchant as specified by the UPTF in U.S. Provisional Application No. 60/401,807, U.S. application Ser. No. 10/458,205, and U.S. application Ser. No. 10/628,583. However, the transaction portion of the voting station message view does not include any data. Thus, the transaction portion of the voting station message view may be omitted. Further, the encoded portion of the voting station message view is encoded using another coding key referred to as a voting station key that is generated according to UPTF.

The voting station message view, for example, has an encoded portion, which consists of reference identification information, such as $DID_1$, and a plaintext portion, which consists of additional reference identification information, such as transaction ID, Time Stamp, and $DID_2$.

The voter device message view and the voting station message view are sent from the Voting Station 120 to the STS 130 (operation 535). The message views may be sent to the STS 130 via any communication link and may be sent through a network, such as the Internet.

The STS 130 "opens" (decodes) both views by applying a decoding operation according to UPTF (operation 540). For example, the decoding operation may be the same as the decoding operation specified in U.S. Provisional Application No. 60/401,807, U.S. application Ser. No. 10/458,205, and U.S. application Ser. No. 10/628,583.

The STS 130 is able to decode both views because the STS 130 is able to determine, or infer, the voting station key and Voter Device 110 coding key $K_{VDi}$ from the communications of the Voter Device 110 and the Voting Station 120 to the STS 130. In particular, after the STS 130 decodes both message views, the encoded part of the voter device message view reveals: "$K_{VSi}$(ballot)+cross reference identifying information+message digest from voting device".

The STS 130 confirms from the decoded message views that the cross reference identification information of the voting station message view matches the corresponding identification information of the voting station message view. Specifically, the STS is able to confirm that the cross reference identifying information of the decoded voting station message view matches the corresponding identifying information of the voter, which is included in the voter device message view.

After both message views are successfully decoded, the STS 130 verifies the agreement by executing a procedure consisting of, for example, a list of matching rules to be applied to both message views. Thus, a series of basic matching operations between both message views are performed and then optionally, application specific matching rules can be applied. If one of the matching rules fails, the verification or matching process is stopped and the STS 130 may generate and send an error message to the Voter Device 110 and/or Voting Station 120 and/or Voting Master 140. At the completion of the verification or matching process, the STS 130 may forward the agreement plus relevant information such as the message digest, which is taken from the decoded message views, to a processing component, such as a Voting Master 140. The verification or matching process may be implemented on a different device but able to communicate with the STS 130 through a reliable and secure communication channel.

The STS 130 sends the agreement (still encoded using $K_{VSi}$) to the Voting Master 140, along with reference information that identifies the submitting Voting Station 120 (operation 545) and possibly the message digest.

Similar to the above-described embodiments, upon receiving the agreement and the reference information that identifies the submitting Voting Station 120, the Voting Master 140 assesses the identity of the submitting Voting Station 120 and subsequently retrieves the corresponding coding key $K_{VSi}$ from the submitting Voting Station 120 to be used to decode the vote (operation 550). The coding key $K_{VSi}$ is sent via a secure communication link between the Voting Station 120 and the Voting Master 140. The coding key $K_{VSi}$ is only known to the Voting Station 120 and the Voting Master 140 and the vote cannot be decoded, e.g., determined, without using coding key $K_{VSi}$. The coding key $K_{VSi}$ may be transferred to the Voting Master 140 immediately upon being generated by the Voting Station 120 or transferred to from the Voting Station 120 to the Voting Master 140 sometime after the STS 130 sends the agreement to the Voting Master 140.

The Voting Master 140 performs various operations, such as confirming the validity of the vote received by the STS 130 (ensuring non-duplication of voting) (operation 555). In addition, the Voting Master 140 can further determine whether the ballot has been modified from the original version supplied by the Voter Device 110 by computing the message digest and checking whether the message digest matches the one supplied by the Voter Device 110 and supplied by the STS 130. The Voting Master 140 can send a confirmation message of the voting operation to the STS 130. Further, the STS 130 may send a confirmation message of the voting operation to the Voter Device 110 and the Voting Station 120 according to the UPTF protocol (operation 560).

Figure 6:
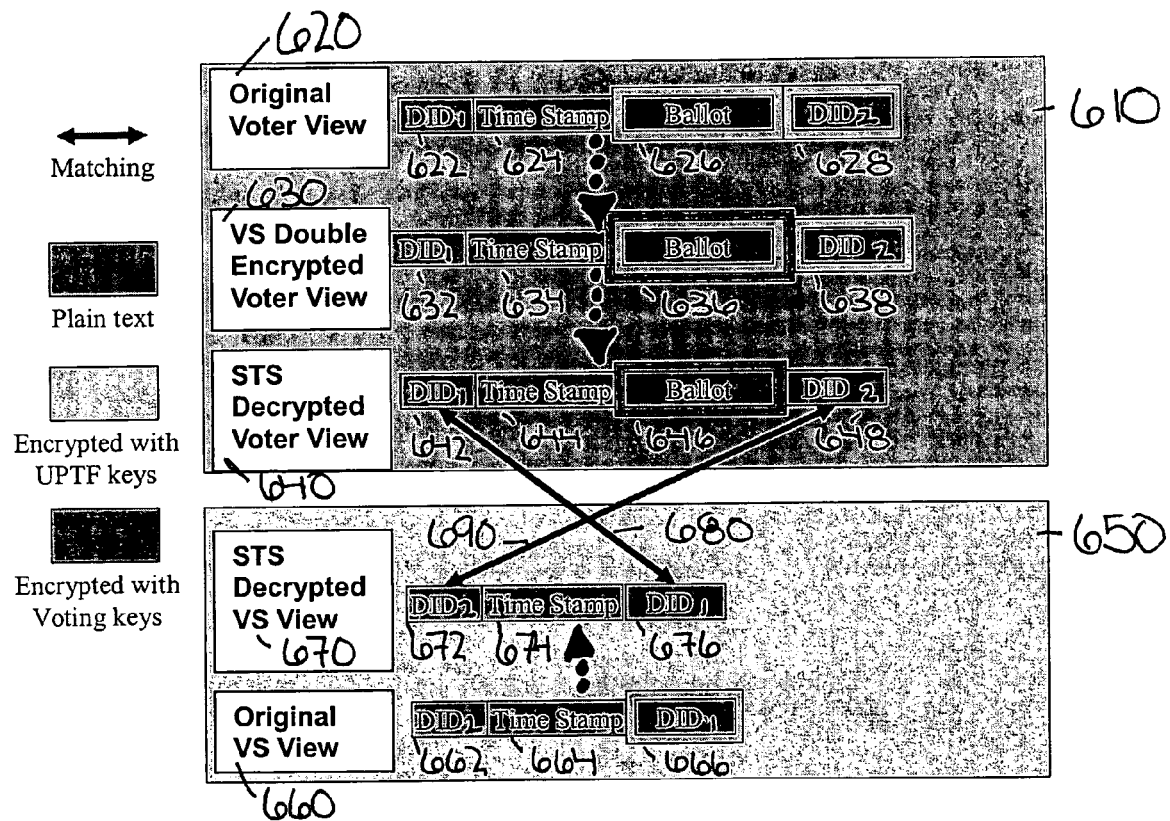
FIG. 6 is an illustration of how the voter device message view and the voting station message view are processed or matched in the Uniform Pervasive Transaction Network scheme according to an embodiment of the present invention.

FIG. 6 illustrates how the voter device message view and the voting station message view are processed or matched in the Uniform Pervasive Transaction Network scheme according to an embodiment of the present invention.

In FIG. 6, the top box 610 illustrates how the voter device message view is processed at the Voter Device 110, Voting Station 120, and STS 130, respectively. The bottom box 650 illustrates how the voting station message view is processed at the Voting Station 120 and STS 130. In the middle of the figure, the double-arrowed lines 680 and 690 illustrate how the matching is performed at the STS 130.

An original voter device message view 620 includes a plain text portion and an encoded portion. The plain text portions are those portions that are not encoded. The plain text portions of the original voter device message view 620 include a voter device identification number ($DID_1$) 622 and a time stamp (TS) 624. The encoded portions of the original voter device message view 620 include a ballot 626 and a voting station device identification number ($DID_2$) 628 and a message digest. The encoded portions are encoded by the Voter Device 110.

The voting station further encoded voter device message view 630 includes plain text portions, encoded portions encoded by the Voter Device 110, and a portion further encoded with a coding key $K_{VSi}$. The plain text portions of the voting station further encoded voter view 630 include a voter device identification number ($DID_1$) 632 and a time stamp (TS) 634. The encoded portions of the original voter device message view 630 include a ballot 636 and a voting station device identification number ($DID_2$) 638 and a message digest. The portion of the Voting Station 120 further encoded voter device message view 630 further encoded with the coding key $K_{VSi}$ is the ballot 636.

The STS decoded voter device message view 640 includes plain text portions and a portion encoded with the coding key $K_{VSi}$. The plain text portions of the STS decoded voter device view 640 include a voter device identification number ($DID_1$) 642, a time stamp (TS) 644, and a voting station identification number ($DID_2$) 648 and a message digest. The portion of the STS decoded voter device message view 640 encoded with the coding key $K_{VSi}$ is the ballot 646.

The original voting station message view 660 includes plain text portions and an encoded portion. The plain text portions of the original voting station message view 660 include a voting station identification number ($DID_2$) 662 and a time stamp (TS) 664. The encoded portion of the original voting station message view 660 includes a voter device identification number ($DID_1$) 666.

The STS decoded voting station message view 670 includes only plain text portions. The plain text portions included in the STS 130 decoded voting station view 670 include a voting station identification number ($DID_2$) 672, a time stamp (TS) 674, and a voter device identification number ($DID_2$) 676.

The STS decoded voter device message view 640 and the STS decoded voting station message view 670 are both sent from the Voting Station 120 to the STS 130. As previously discussed, the STS 130 confirms whether the cross reference identifying information of the decoded voting station message view matches the corresponding identifying information of the voting station message view using a predetermined mechanism and format according to an SAS protocol of the UPTF to authenticate the voter and Voter Device 110.

The double arrows 680 and 690 shown in FIG. 6 illustrate the matching process that is done at the STS 130. Arrow 680 depicts the matching process of the voter device identification number ($DID_1$) 642 of the STS decoded voter device message view 640 with the voter device identification number ($DID_1$) 676 of the STS decoded voting station message view 670. Arrow 690 depicts the matching process of the voting station identification number ($DID_2$) 648 of the STS decoded voter device message view 640 with the voting station identification number ($DID_2$) 672 of the STS decoded voting station message view 670.

Further, since the STS 130 does not know the coding key $K_{VSi}$, which is only known to the Voting Master 140 and Voting Station 120, and the encoding using the coding key $K_{VSi}$ is applied after the Voter Device 110 encodes the ballot and the cross-reference identifying information for the Voting Station 120, for the STS to be able to decode the encoding added by the Voter Device 110, the encoding algorithm should be commutative.

For example, if Ki and Kj are encoding operations and x is text to be encoded then $Ki(Kj(x))=Kj(Ki(x))$. As a result $K_{VSi}(STS\_K_{VDj}(ballot))=STS\_K_{VDj}(K_{VSi}(ballot))$. The STS 230 is aware of $STS\_K_{VDj}$ and thus can decode $STS\_K_{VDj}(K_{VSi}(ballot))$ and reveal the $K_{VSi}(ballot)$. One example of a commutative cipher is the XOR stream cipher. Other common commutative ciphers use the Pohlig-Hellman Algorithm or the Shamir-Omura algorithm. The first is based on Elliptic Curve Cryptography (ECC), and the other is based on RSA cryptography.

In order for the Voting Station 120 to further encode the ballot portion of the message from the Voter Device 110, the encoded ballot should be identifiable. For example, the encoded ballot may also be given to the Voting Station 120 as a separately encoded data item. The Voting Station 120 will further encode with the coding key $K_{VSi}$ only the part of the voter device message view that represents the ballot.

The above-described embodiments, as illustrated in FIGS. 1, 5, and 6, address the issue of not having an non-encoded vote being exchanged on a potentially non-encoded communication link. Non-encoded votes being exchanged on non-encoded communication links would be inviting to eavesdroppers, unauthorized services and masquerading users. Thus, the above-described embodiments prevent various attacks targeted at both the Voter Device 110 and the communication levels of the pervasive transaction system.

Another embodiment of the present invention, having similar devices, architecture, overall framework, and modifications over UPTF as in the embodiments discussed above, is described below and illustrated in FIGS. 1 and 7. In the below-described embodiment of the invention, the STS 130 does not receive or handle the ballot, thereby preventing the opportunity for the STS 130 and the Voting Master 140 to be in collusion with each other to determine the identity of a particular voter who cast a particular ballot. The message digest can be used to detect if the Voting Station 120 has modified the ballot submitted by a Voter Device 110.

The below-described embodiments include at least the following additional properties. The embodiments do not require the encryption algorithms to be commutative. Further, it is possible to ensure that all votes have been counted by way of cross checking all votes responded to by the STS 130, since all votes are associated with a particular voting number. For example, because all votes are associated with a voting number, when you count the votes and it is known how many voting numbers are issued, you can compare the number of votes counted with the number of voter numbers issued, e.g., total number of eligible voters.

The modifications and properties discussed in the above-described embodiments are assumed to be present in the embodiments described below.

Figure 7:
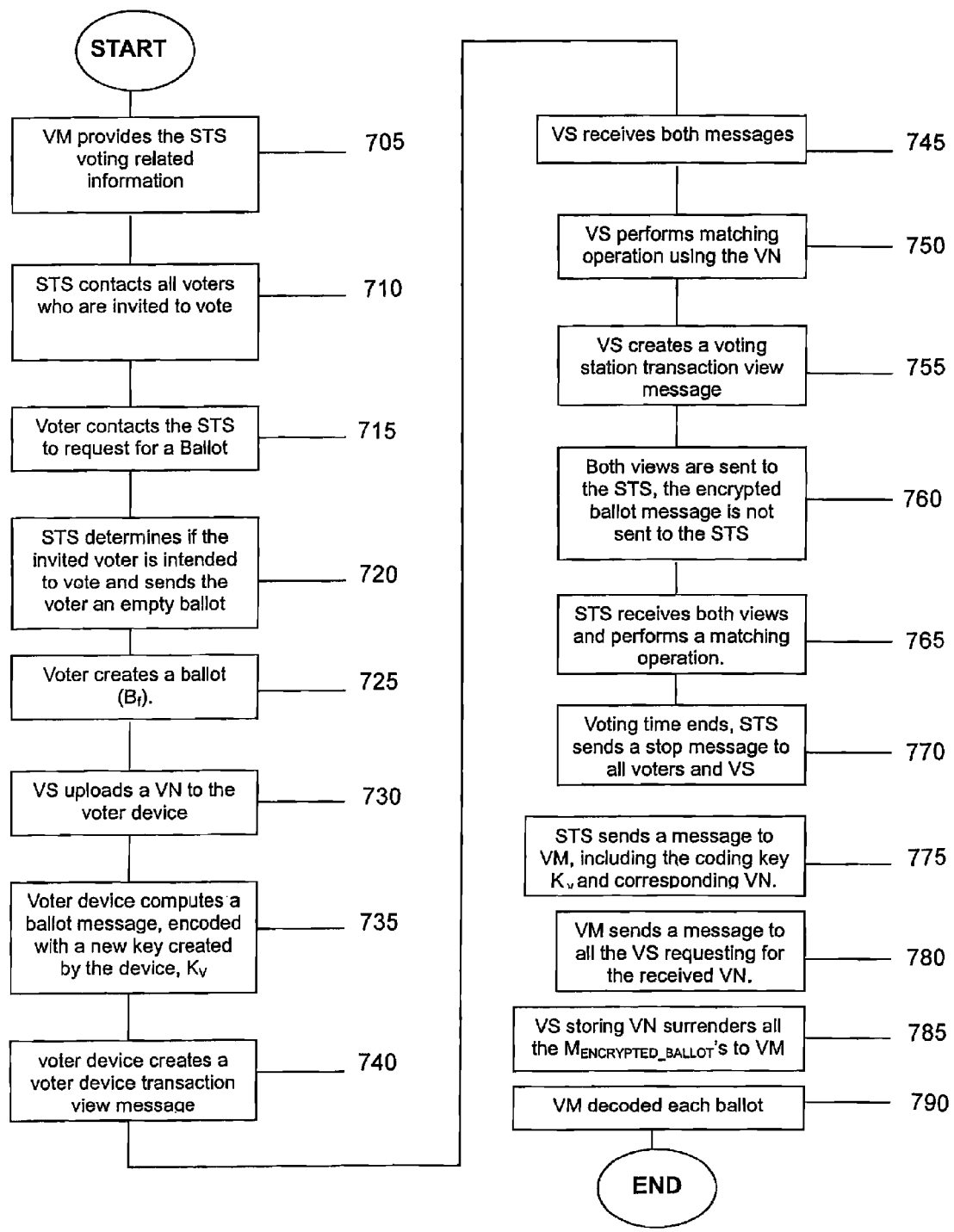
FIG. 7 is a method of performing an opinion registering application in a Universal Pervasive Transaction Framework, using the system architecture shown in FIG. 1, according to an embodiment of the present invention.

FIG. 7 illustrates another method of performing an opinion registering application in a UPTF using the system architecture shown in FIG. 1. However, the system architecture further includes a virtual private network ("VPN") located between the Voting Master 140 and each of the Voting Stations 120 (only one shown in FIG. 1) and another VPN located between the STS 130 and the Voting Master 140. The VPNs are not shown in FIG. 1. Including the VPNs in the system architecture does change the essential features of the method of performing the opinion registering application in the UPTF. At least one of the VPNs may be applied to any of the above-described embodiments of the present invention. Briefly, the VPN is a way to communicate through a dedicated server securely to a network over the Internet and provide additional security to wireless local area networks ("LAN").

At operation 705, the Voting Master 140 provides the STS 130 with at least the following information: address of each Voting Station 120 to be used for the voting application, list of voter identifiers or device ID's of voters which will be invited to participate in the voting, start and end time for voting, and an empty ballot ($B_e$).

The STS 130 contacts all the voters on the list of voters provided by the Voting Master 140 and invites the voters to vote at the start time of the voting process (operation 710). For example, a voter may be contacted via an invitation message sent to the voter's Voter Device 110 (PDA, cellular telephone, computer, etc.).

Upon being invited to participate in the voting, the voter, via the Voter Device 110, contacts the STS 130 to request a ballot (operation 715). For example, the voter may contact the STS 130 through a reply message on the Voter Device 110.

The STS 130 determines whether the invited voter is intended to vote, and if so, transmits an empty ballot to the appropriate Voter Device 110 for the voter to vote (operation 720). For example, the STS 130 may determine the intended voters from a voter database 135 that stores identification information. Preferably, the voter database 135 is a secure database to prevent unauthorized users or devices from obtaining the information. As previously discussed, the STS 130 is able to determine a particular voter from a Voter Device 110 and a particular Voting Station 120. In addition, the transaction between the STS 130 and the Voter Device 110 may be encoded to prevent tampering with the empty ballot upon delivery. Further, the STS may log or store the requests for accounting purposes.

The voter enters the information onto the ballot ($B_f$) (operation 725). The ballot does not need to be completed by the voter before being cast or submitted. Thus, a completed ballot does not necessarily indicate that the entire ballot was filled in or that all possible votes were made.

When the ballot $B_f$ is created, the Voting Station 120 uploads a voting number ("VN") to the Voter Device 110 (operation 730). For example, the VN is a random number, unique for each voting transaction, with an optional voting station prefix.

The Voter Device 110 generates a ballot message, encoded with a new key created by the device, $K_V$ (operation 735). The encoded ballot message looks as follows.

$$M_{ENCODED\_BALLOT} = K_v[B_f + VN + \text{Time}], VN$$

The Voter Device 110 also generates a voter device transaction view message, from the Voter Device 110 (operation 740). In the body of the transaction of the voter device transaction view message is the VN and $K_V$, and optionally the time of voting (time stamp).

The Voting Station 120 receives both messages, the encoded ballot message and the voter device transaction view message (operation 745). The Voting Station 120 determines whether the VN received in the $M_{ENCODED\_BALLOT}$ message is the same as the VN uploaded in the Voter Device 110 by the Voting Station 120 (operation 750). Such determination is done to prevent or learn of tampering with the message in the wireless link between the Voter Device 110 and the Voting Station 120.

The Voting Station 120 creates a voting station transaction view message (operation 755). The voting station transaction view message is generated according to the same methods as discussed in the above-described embodiments of the present invention. For example, in the body of the voter device transaction view message is the VN and optionally, the time when the vote was submitted (time stamp).

The Voting Station 120 sends both the voter device transaction view message and the voting station transaction view message to the STS 130 (operation 760). However, the encoded ballot message is not sent to the STS 130 and is instead stored in a local database in the Voting Station 120.

In the local database of the Voting Station 120, each encoded ballot message is indexed according to its VN. In the local database of the Voting Station 120, the encoded ballot message will be marked as not recounted and not acknowledged. The local database of the Voting Station 120 may also include information about the voter, so that, for example, if the vote is encoded, the Voting Station 120 could know which voter had voted, but not know the content of the vote.

The STS 130 receives both transaction view messages and determines whether the voting transaction is valid, e.g., verifies that a particular voter voted at a particular Voting Station 120 (operation 765). Neither of the transaction view messages includes the ballot (agreement). Therefore, the STS 130 is incapable of determining the content of the ballot, regardless if the STS 130 is in collusion with the Voting Master 140.

The STS 130 determines the validity of the voting transaction according to the same method as discussed with the above-described embodiments of the present invention. For example, the STS 130 confirms from the decoded message views that the cross reference identification information of the voting station message view matches the corresponding identification information of the voting station message view. Specifically, the STS 130 is able to confirm that the cross reference identifying information of the decoded voting station message view matches the corresponding identifying information of the voter, which is included in the voter device message view.

When the STS 130 determines the voting transaction to be valid (as determined by a SAS protocol for the opinion registering application 200 of the UPTF), the STS 130 transmits an acknowledge message to the Voting Station 120, along with a VN. The Voting Station 120 will mark the message as acknowledged.

The foregoing process will continue until the end time for voting arrives, as determined by the Voting Master 140. When the end time for voting arrives, the STS 130 transmits a message to all of the invited voters and to all corresponding Voting Station 120 to finish all voting transactions (operation 770).

The STS 130 sends a message to the Voting Master 140, including the coding key $K_V$ and the corresponding VN (operation 775). The STS 130 may additionally include in the transaction to the Voting Master 140 the identification of the Voting Station 120 that stores the encoded ballot corresponding to each VN.

The Voting Master 140 sends a message to all the Voting Station 120 requesting for the received VN (operation 780). However, if the STS 130 has informed the Voting Master 140 about which Voting Station 120 holds the encoded ballot for each VN, then the Voting Master 140 will not contact all Voting Station 120. The Voting Station 120 storing the VN in its local database surrenders the $M_{ENCODED\_BALLOT}$'s to the Voting Master 140, and labels that vote as recounted (operation 785). However, if the vote has not been acknowledged by the STS 130, then an error message may be sent to the Voting Master 140.

The Voting Master 140 is in possession of $M_{ENCODED\_BALLOT}$ and the coding key $K_V$ and decodes each ballot (operation 790). As previously discussed, the Voting Master 140 cannot know which voter cast a particular vote, as the Voting Master 140 is only in possession of the coding key $K_V$, the ballot, and the VN. None of this information supplies any information about the voter; therefore, the Voting Master 140 cannot determine which particular voter cast the particular vote.

Further, when the voting time ends, each Voting Station 120 could know which ballots where successfully retrieved, which ballots where acknowledged, and which ballots were recounted. As such, a verifiable database of the votes, indexed by VN, may be determined and stored.

Figure 8:
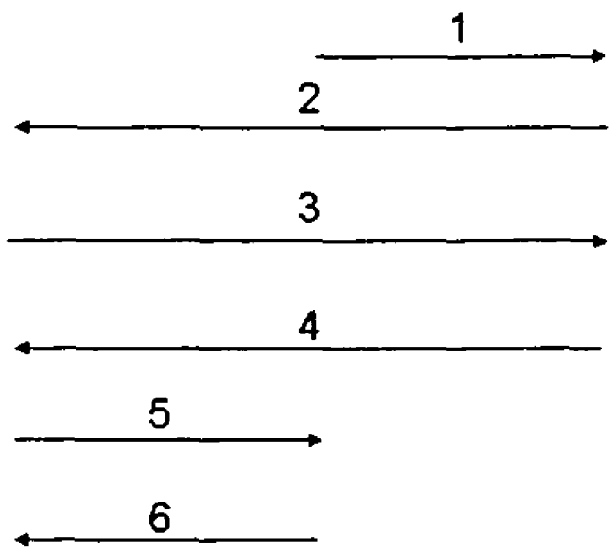
FIG. 8 illustrates a message exchange of the method described in FIG. 7 according to an embodiment of the present invention.
Figure 8:
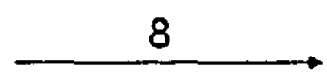
Figure 8:
Figure 8:
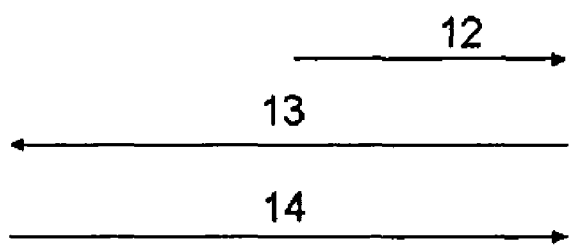

FIG. 8 illustrates a message exchange of the method described above and shown in the flowchart of FIG. 7.

Positioned horizontally across the top of FIG. 8, from left to right, respectively, are markers identified as the Voter Device 110, Voting Station 120, STS 130, and Voting Master 140. Below the markers are horizontal lines in descending order showing the location of a transaction at various stages of the message exchange, with respect to the markers, according to an embodiment of the invention.

According to FIG. 8, the Voting Station 120 initially sends at least the address, list of identification numbers that will participate in the voting, empty ballots, and start time and end time of voting, to the STS 130, as shown in Line 1. Next, as shown in Line 2, the STS 130 contacts all the voters listed that are invited to participate in the voting. For example, a message, such as a text message, may be transmitted to the Voter Device 110 indicating that the voter is invited to participate.

Next, as shown in Line 3, the voter requests an empty Ballot ($B_e$) from the STS 130. For example, a voter request message is sent from the Voter Device 110 to the STS 130. This message may be encoded according to UPTF, as discussed in the above-described embodiments of the present invention. The voter request transaction may additionally be recorded by the STS 130 for consistency and record keeping purposes.

Next, as shown in Line 4, the STS 130 sends $B_e$ to the Voter Device 110 so that the voter may perform the voting operation. This message may be encoded according to UPTF, as discussed in the above-described embodiments of the present invention, to prevent fake, tampered, or unofficial ballots from being sent to voters.

Next, as shown in Line 5, a request to vote is sent by the Voter Device 110 to the Voting Station 120. The request to vote may be sent to provide further voting protection and allow the Voting Station 120 to check the $B_e$ for consistency to ensure that no tampering with the ballots was done at the STS 130.

Next, as shown in Line 6, a VN is sent to the Voter Device 110 from the Voting Station 120. For example, the VN is a random number generated by the Voting Station 120. The VN may be generated based on a RSN, time stamp, etc.

Next, as shown in Line 7, the Voter Device 110 generates a coding key $K_v$. For example, the coding key $K_v$ is generated at random. The coding key may be generated based on a RSN, time stamp, etc. For example, the coding key $K_v$ is a random number generated by the Voter Device 110, such as through a random number generator.

Next, as shown in Line 8, the Voter Device 110 sends the VN to the Voting Station 120 using the following framework of the opinion registering application of the UPTF (voting device message view): DID, $K_{UPTF,v}$(VN: $K_v$,UID,DID). The $K_{UPTF,v}$ is the encoding key for the encoded portion of the ballot generated by the Voter Device 110 according to UPTF. The encoded portion of the message generated at the Voter Device 110 is discussed in detail in the above-described embodiments of the present invention.

The Voter Device 110 also sends the ballot encoded with $K_v$ ($M_{ENCODED\_BALLOT}$) to the Voting Station 120 using the following UPTF framework: $K_v$ ($B_f$,VN),VN.

Next, as shown in Line 9, the Voting Station 120 stores the VN in the local database according to predetermined criteria. For example, the VN may be stored according to whether it is "acknowledged" or "recounted." The Voting Station 120 also stores the ballot encoded with $K_v$, e.g., $K_v$ ($B_f$,VN),VN, in the local database.

In addition, the Voting Station 120 sends the voter device message view (DID,$K_{UPTF,v}$(VN: $K_v$,UID,DID)), along with a voting station message view generated by the Voting Station 120 (UID, $K_{UPTF,vs}$ (VN:,UID,DID)), to the STS 130.

Next, as shown in Line 10, the STS 130 performs a matching operation with the voter device message view and the voting station message view. For example, when the VN matches the VN stored in the local database of the Voting Station 120, the STS 130 sends an encoded acknowledge message to the Voting Station 120 and a receipt with the VN to the Voter Device 110. Note, for example, that the receipt can be sent directly to the Voter Device 110 without first being sent to the Voting Station 120.

Next, as shown in Line 11, the Voting Station 120 checks (classifies) the vote as "acknowledged" in the local database and sends a receipt indicating such to the Voter Device 110.

The above described process, with respect to at least the transactions shown in Lines 1-10, is repeated until either all of the invited voters have voted or the time for voting expires, as determined by the Voting Master 140. In FIG. 6, the dashed line below Line 11 represents operations that occur when the time for voting expires.

Next, as shown in Line 12, when the time for voting expires, the STS 130 a message to the Voting Master 140, including the coding key $K_V$ and the corresponding VN.

Next, as shown in Line 13, the Voting Master 140 sends a message to the Voting Station 120 requesting the VN corresponding with the Voting Station 120. This is done for verification purposes to ensure that the proper voter has voted and that there has been no tampering with the ballot.

Finally, as shown in Line 14, the Voting Station 120 sends a message to the Voting Master 140, including the encoded ballot stored in the local database and the coding key $K_v$ ($K_v$ ($B_f$,VN)). In addition, the Voting Station 120 may "acknowledge" the vote as recounted. As previously described, the acknowledgement may be done by a simple checking or classification procedure.

According to the foregoing transactions, the Voting Master 140 cannot know which voter cast a particular vote, as the Voting Master 140 is only in possession of the coding key $K_V$, the ballot, and the VN. None of this information supplies any information about the voter.

After the Voting Master 140 receives the encoded ballot stored in the local database and the coding key $K_v$ ($K_v$ ($B_f$, VN)), the Voting Master 140 may proceed with performing a predetermined operation, such as counting the votes. In doing so, the Voting Master 140 may be in communication with the Voting Station 120 so that the Voting Station 120 may correct possible errors and/or further classify the votes as "Not acknowledged" and "Not recounted."

As discussed above, the present invention significantly broadens the scope of applications of the UPTF. In addition, there are many benefits provided by the opinion registering application using UPTF described in the embodiments of the present invention. For example, the voting station is relatively easy to set up, the voting equipment is inexpensive and less personnel is necessary for carrying out the voting process, the process is flexible and fast for voters, parallelization of the voting actions (simultaneous voting), there is no waiting in line, and voters are not limited to voting in any one particular voting station.

According to another embodiment of the invention, the embodiments discussed above may be used in an e-government application. For example, this dual-purpose use of the UPTF framework would be beneficiary to the deployment of UPTF, especially by disseminating UPTD's in the hand of voters who also happen to be consumers.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer-based system securely transmitting and authenticating a transaction input by a user while retaining the anonymity of the user with respect to content of the transaction, comprising:

a first device receiving the content of the transaction input at the first device and transmitting, to a second device, the transaction content including information identifying the first device and the second device;

wherein the second device encoding the transaction content input at the first device with a code key $K_{VSi}$, sending the transaction content that is encoded with the code key $K_{VSi}$ to the first device, the first device generating a first message by further encoding the information identifying the first and second devices and the transaction content encoded with the code key $K_{VSi}$ with an independently generated first device changing key derived from both a user input non-transmitted parameter and a first device parameter generated for each transaction based upon a stored first device parameter, and the second device generating a second device encoded second message by encoding the transaction content encoded with the code key $K_{VSi}$ and the information identifying the first and second devices, with an independently generated second device key; and a third device receiving the encoded second message from the second device and receiving the encoded first message of the first device, decoding only the encoding by the first and second device keys of the received encoded first and second messages based upon the third device independently generating the respective first and second device keys to:

authenticate an identity of the user of the first device and authenticate the first device, authenticate the second device and authenticate an occurrence of the transaction by matching the decoded messages of the first and second devices based upon the information identifying the first and second devices for confirming input of the transaction content to involve intended first and second devices, and forwarding the encoded transaction content encoded with the code key $K_{VSi}$ to a fourth device;

wherein the fourth device receiving the encoded transaction content encoded with the code key $K_{VSi}$ and using the code key $K_{VSi}$ to determine the transaction content input by the user of the first device.

2. The computer-based system of claim 1, wherein the second device and the fourth device agree on the code key $K_{VSi}$, or a public key cryptographic key pair, prior the transaction being transmitted in the computer-based system, and wherein the third device sends the information identifying the second device to the fourth device so that the fourth device can retrieve the code key $K_{VSi}$ of the second device to decode the transaction content that is encoded with the code key $K_{VSi}$.

3. The computer-based system of claim 1, wherein the second device cannot determine the identity of the user that input the content of the transaction because when the content of the transaction is input at the first device and submitted to the second device, the first device does not transmit user identifying information to the second device, and because in the first message generated by the first device, the identity of the user is encoded by the first device according to a coding technique that can only be decoded by the third device.

4. The computer-based system of claim 1, wherein the fourth device cannot determine the identity of the user that input the content of the transaction since the fourth device cannot determine the first device in which the content of the transaction was input by the user.

5. The computer-based system of claim 4, wherein the third device authenticates the identity of the user of the first device after successfully decoding the encoded messages of the first and second device by reconstructing the keys of each of the first and second devices since the third device knows parameters of coding algorithms used to produce the respective first and second device keys.

6. The computer-based system of claim 5, wherein the user is authenticated to operate the first device according at least one biometric feature of the user or a personal identification number.

7. The computer-based system of claim 5, wherein the transaction of the computer system is performed between the first and the second device, the transaction is an opinion registering application, and the content of the transaction is a ballot.

8. The computer-based system of claim 1, wherein there is one or more first device and one or more second device.

9. The computer-based system of claim 1, further comprising a virtual private network located between the second device and the fourth device and another virtual private network located between the third device and the fourth device.

10. A computer-based system securely transmitting and authenticating content input by a user while retaining the anonymity of the user with respect to the user input content, comprising:
  a first device independently generating an encoded first message, including the user input content and information identifying the first device, according to a first device changing key derived from both a user input non-transmitted parameter and a first device parameter generated for each first message based upon a stored first device parameter;
  a second device further encoding the user input content of the encoded first message with a code key $K_{VSi}$ and independently generating a second device encoded second message by encoding the user input content encoded with the code key $K_{VSi}$ and information identifying the first and second devices, with a generated second device key;
  a third device
  receiving the encoded first and second messages,
  decoding only the encoding by the first and second device keys of the encoded first and second messages based upon the third device independently generating the respective first and second device keys to:
    authenticate an identity of the user of the first device and authenticate the first device,
    authenticate the second device,
    authenticate the first and second messages by matching the decoded messages of the first and second devices based upon the information identifying the first and second devices for confirming input of the content to involve intended first and second devices, and
    forwarding the user input content encoded with the code key $K_{VSi}$; and a fourth device receiving the user input content encoded with the code key $K_{VSi}$ and using the code key $K_{VSi}$ to determine the content input by the user of the first device.

11. The computer-based system of claim 10, wherein coding algorithm used for further encoding the user input content of the encoded message with the code key $K_{VSi}$ is commutative with the algorithm used by the first device to generate the encoded message.

12. The computer-based system of claim 10, wherein the second device message does not include the user input content.

13. The computer-based system of claim 10, wherein the second device and the fourth device agree on the code key $K_{VSi}$, or a public key cryptographic key pair, prior the transaction being transmitted in the computer-based system, and
  wherein the third device sends the information identifying the second device to the fourth device so that the fourth device can retrieve the code key $K_{VSi}$ of the second device to decode the user input content of the encoded message encoded with the coding key $K_{VSi}$.

14. The computer-based system of claim 10, wherein the third device cannot determine the user input content encoded with the coding key $K_{VSi}$, and the fourth device cannot determine the identity of the user that input the user input content because the fourth device only receives the user input content.

15. The computer-based system of claim 10, wherein the third device authenticates the identity of the user of the first device after successfully decoding the encoded messages of the first and second device by reconstructing the keys of each of the first and second devices since the third device knows parameters of coding algorithms used to produce the respective first and second device keys.

16. The computer-based system of claim 10, wherein the user input content is a ballot.

17. The computer-based system of claim 10, wherein there is more than one first device and more than one second device.

18. The computer-based system of claim 10, further comprising a virtual private network located between the second device and the fourth device and another virtual private network located between the third device and the fourth device.

19. A computer-based system securely transmitting and authenticating content input by a user while retaining the anonymity of the user with respect to the content, comprising:
  a first device
    receiving from a second device a reference number, which relates to content to be input by the user,
    generating a first encoded message after content is input by the user at the first device, such that the first encoded message includes the user input content that is encoded with a random code key $K_V$, the first device generating a second encoded message including the random code key $K_V$, information identifying the first and second devices, and the reference number with an independently generated first device changing key derived from both a user input non-transmitted parameter and a generated first device parameter generated for each first message based upon a stored first device parameter, and
    sending the first and second encoded messages to the second device;
  the second device:
    forwarding the first encoded message to a fourth device,
    forwarding the second encoded message to a third device,
    generating a third encoded message without the user input content and including the random code key $K_V$, the information identifying the first and second devices, and the reference number with an independently generated second device key, and
    forwarding the third encoded message to the third device;
  the third device:
    receiving the second and third encoded messages from the second device, which do not have the user input content,
    decoding only the encoding by the first and second device keys of the second and third messages based upon the third device independently generating the respective first and second device keys to:
      authenticate an identity of the user of the first device and authenticate the first device,
      authenticate the second device,
      authenticate the second and third messages by matching the decoded messages of the first and second devices based upon the information indicating identifying the first and second devices and the reference number for confirming input of the content to involve intended first and second devices, and forwarding the code key $K_V$ and the reference number to the fourth device; and the fourth device receiving from the second device the first encoded message and the reference number, receiving from the third device the random code key $K_V$ and the reference number, and determining from the received information the user input content.

20. The computer-based system of claim 19, wherein the first encoded message is stored in a database of the second device and is not sent to the fourth device to be decoded until the third device has verified the identity of the user and the first and second messages are authenticated.

21. The computer-based system of claim 19, wherein the third device never receives the user input content, and the fourth device cannot determine the identity of the user that input the user input content because the fourth device does not receive identifying information of the user.

22. The computer-based system of claim 19, wherein the user input content is a ballot.

23. The computer-based system of claim 19, wherein there is more than one first device and more than one second device.

24. The computer-based system of claim 19, further comprising a virtual private network located between the second device and the fourth device and another virtual private network located between the third device and the fourth device.

25. The computer-based system of claim 19, wherein the user input content is encoded whenever sent from the first device to any other device in the computer-based system, wherein the third device never receives the user input content, and wherein there is an accounting for the user input content so that errors are located.

* * * * *

UNITED STATES PATENT AND TRADEMARK OFFICE
CERTIFICATE OF CORRECTION

| | | |
|---|---|---|
| PATENT NO. | : 7,877,605 B2 | Page 1 of 1 |
| APPLICATION NO. | : 11/041223 | |
| DATED | : January 25, 2011 | |
| INVENTOR(S) | : Yannis Labrou et al. | |

It is certified that error appears in the above-identified patent and that said Letters Patent is hereby corrected as shown below:

Column 26, Line 67, In Claim 19, after "information" delete "indicating".

Signed and Sealed this
Twenty-sixth Day of April, 2011

David J. Kappos
*Director of the United States Patent and Trademark Office*